(12) United States Patent
Nam et al.

(10) Patent No.: US 12,041,552 B2
(45) Date of Patent: Jul. 16, 2024

(54) WAKE-UP BEHAVIOR INDICATION FOR POWER SAVING

(71) Applicant: QUALCOMM Incorporated, San Diego, CA (US)

(72) Inventors: Wooseok Nam, San Diego, CA (US); Tao Luo, San Diego, CA (US); Peter Pui Lok Ang, San Diego, CA (US); Peter Gaal, San Diego, CA (US); Wanshi Chen, San Diego, CA (US); Muhammad Sayed Khairy Abdelghaffar, San Jose, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 18/056,359

(22) Filed: Nov. 17, 2022

(65) Prior Publication Data

US 2023/0075265 A1 Mar. 9, 2023

Related U.S. Application Data

(62) Division of application No. 16/947,715, filed on Aug. 13, 2020, now Pat. No. 11,533,685.

(Continued)

(51) Int. Cl.
*H04W 52/02* (2009.01)
*H04W 68/00* (2009.01)
*H04W 76/28* (2018.01)

(52) U.S. Cl.
CPC ... *H04W 52/0235* (2013.01); *H04W 52/0216* (2013.01); *H04W 68/00* (2013.01); *H04W 76/28* (2018.02)

(58) Field of Classification Search
CPC ......... H04W 52/0235; H04W 52/0216; H04W 68/00; H04W 76/28; H04W 52/0229; H04W 68/02; Y02D 30/70
(Continued)

(56) References Cited

U.S. PATENT DOCUMENTS

2012/0275364 A1* 11/2012 Anderson ......... H04W 52/0222
370/311
2016/0381636 A1* 12/2016 Park .................... H04L 27/0002
370/311
(Continued)

FOREIGN PATENT DOCUMENTS

WO 2018172375 A1 9/2018
WO 2019033112 A1 2/2019

OTHER PUBLICATIONS

International Preliminary Report on Patentability—PCT/US2020/046267, The International Bureau of WIPO—Geneva, Switzerland, Mar. 3, 2022.

(Continued)

*Primary Examiner* — Inder P Mehra
(74) *Attorney, Agent, or Firm* — Haynes and Boone, LLP

(57) ABSTRACT

Wireless communication devices, systems, and methods related to handling wake-up behavior for power saving, including during discontinuous reception (DRX) operation are provided. For example, a method of wireless communication includes transmitting, by a base station (BS) to a user equipment (UE), a default wake-up configuration associated with a discontinuous reception (DRX) operation; determining, by the BS, whether to transmit a wake-up signal (WUS) to the UE during a WUS occasion based on a traffic load; and transmitting, by the BS, a physical downlink control channel (PDCCH) signal during a duration associated with the WUS occasion.

20 Claims, 15 Drawing Sheets

Related U.S. Application Data

(60) Provisional application No. 62/888,352, filed on Aug. 16, 2019.

(58) Field of Classification Search
USPC .......................................................... 370/311
See application file for complete search history.

(56) References Cited

U.S. PATENT DOCUMENTS

| | | |
|---|---|---|
| 2018/0332533 A1 | 11/2018 | Bhattad et al. |
| 2019/0281504 A1* | 9/2019 | Su .......................... H04W 52/28 |
| 2020/0037247 A1 | 1/2020 | Liao et al. |
| 2020/0037396 A1 | 1/2020 | Islam et al. |
| 2020/0163017 A1* | 5/2020 | Priyanto ............ H04W 52/0229 |
| 2020/0229095 A1 | 7/2020 | Shrestha et al. |
| 2021/0007053 A1* | 1/2021 | Jiang ...................... H04W 76/28 |
| 2021/0022202 A1* | 1/2021 | Kim ....................... H04W 76/27 |
| 2021/0051589 A1 | 2/2021 | Nam et al. |
| 2021/0377854 A1 | 12/2021 | Hwang et al. |
| 2022/0039012 A1 | 2/2022 | Kwon et al. |

OTHER PUBLICATIONS

International Search Report and Written Opinion—PCT/US2020/046267—ISA/EPO—Nov. 20, 2020.
Taiwan Search Report—TW109127703—TIPO—Dec. 24, 2023.

* cited by examiner

WAKE-UP BEHAVIOR INDICATION FOR POWER SAVING

CROSS-REFERENCE TO RELATED APPLICATIONS AND PRIORITY CLAIM

The present application is a divisional application of U.S. patent application Ser. No. 16/947,715, filed Aug. 13, 2020, which claims priority to and the benefit of U.S. Provisional Patent Application No. 62/888,352, filed Aug. 16, 2019, each of which is hereby incorporated by reference in its entirety as if fully set forth below and for all applicable purposes.

TECHNICAL FIELD

This application relates to wireless communication systems, and more particularly to methods (and associated devices and systems) for handling wake-up behavior for power saving, including during discontinuous reception (DRX) operation.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

Due to the power demands on wireless communication devices associated with voice, video, packet data, messaging, broadcast, and other communications, there is a desire to limit usage of device components and save power when possible. DRX is a technique in which a UE may enter a sleep mode for a certain period of time and enter a wake-up mode for another period of time. The sleep mode allows the UE to power down certain radio components or at least switch certain radio components to a lower power state than an active state. Accordingly, the use of DRX can provide power savings at the UE. Similarly, discontinuous transmission (DTX) is a technique that may be utilized by a UE to refrain from transmitting signals in certain situations. When the UE refrains from transmitting signals using DTX, the UE can power down certain radio components, switch certain radio components to a lower power state than an active state, or otherwise reduce the power demand of the UE. Similar, DRX and/or DTX techniques may be applied to a BS to save power and/or other system resources. In addition, by refraining from transmitting signals using DTX, network traffic and the potential for interference can be reduced. With UEs and/or BSs operating in DRX and DTX modes, there is a need to ensure the devices communicate in a manner that provides users with the expected levels of communication latency and throughput, while also providing power savings and prolonged battery life.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Aspects of the present disclosure provide solutions for how a user equipment (UE) should perform a wake-up when a wake-up signal (WUS) is not received from a base station (BS), while simultaneously retaining the power savings benefits associated with discontinuous reception (DRX) and discontinuous transmission (DTX) operations. In some instances, a default wake-up configuration is utilized by the UE when a WUS is not received from the BS during a WUS occasion. In this regard, the default wake-up configuration may cause the UE to skip PDCCH monitoring (e.g., remain in sleep mode) during an on-duration associated with the WUS occasion. Alternatively, the default wake-up configuration may cause the UE to actively perform PDCCH monitoring during the on-duration associated with the WUS occasion. The default wake-up configuration can be dynamically and/or semi-statically configured to select whether the UE should skip or actively perform PDCCH monitoring during the on-duration associated with the WUS occasion.

In an aspect of the disclosure, a method of wireless communication includes receiving, by a user equipment (UE) from a base station (BS), a default wake-up configuration associated with a discontinuous reception (DRX) operation; monitoring, by the UE during a wake-up signal (WUS) occasion, for a WUS from the BS; determining, by the UE, whether the WUS was received from the BS during the WUS occasion; and performing, by the UE, physical downlink control channel (PDCCH) monitoring based on the default wake-up configuration and whether the WUS was received from the BS during the WUS occasion.

In an additional aspect of the disclosure, a method of wireless communication includes transmitting, by a base station (BS) to a user equipment (UE), a default wake-up configuration associated with a discontinuous reception (DRX) operation; determining, by the BS, whether to transmit a wake-up signal (WUS) to the UE during a WUS occasion based on a traffic load; and transmitting, by the BS, a physical downlink control channel (PDCCH) signal during a duration associated with the WUS occasion.

In an additional aspect of the disclosure, a user equipment (UE) includes a transceiver configured to: receive, from a base station (BS), a default wake-up configuration associated with a discontinuous reception (DRX) operation; and monitoring, during a wake-up signal (WUS) occasion, for a WUS from the BS; and a processor in communication with the transceiver, the processor configured to: determine whether the WUS was received from the BS during the WUS occasion; and perform physical downlink control channel (PDCCH) monitoring based on the default wake-up configuration and whether the WUS was received from the BS during the WUS occasion.

In an additional aspect of the disclosure, a base station includes a transceiver configured to: transmit, to a user equipment (UE), a default wake-up configuration associated with a discontinuous reception (DRX) operation and transmit a physical downlink control channel (PDCCH) signal during a duration associated with a wake-up signal (WUS) occasion; and a processor in communication with the transceiver, the processor configured to: determine whether to transmit a WUS to the UE during the WUS occasion based on a traffic load.

In an additional aspect of the disclosure, a non-transitory computer-readable medium has program code recorded thereon, the program code including code for causing a user equipment (UE) to receive, from a base station (BS), a default wake-up configuration associated with a discontinuous reception (DRX) operation; code for causing the UE to monitor, during a wake-up signal (WUS) occasion, for a WUS from the BS; code for causing the UE to determine whether the WUS was received from the BS during the WUS occasion; and code for causing the UE to perform physical downlink control channel (PDCCH) monitoring based on the default wake-up configuration and whether the WUS was received from the BS during the WUS occasion.

In an additional aspect of the disclosure, a non-transitory computer-readable medium has program code recorded thereon, the program code including code for causing a base station (BS) to transmit, to a user equipment (UE), a default wake-up configuration associated with a discontinuous reception (DRX) operation; code for causing the BS to determine whether to transmit a wake-up signal (WUS) to the UE during a WUS occasion based on a traffic load; and code for causing the BS to transmit a physical downlink control channel (PDCCH) signal during a duration associated with the WUS occasion.

Other aspects, features, and advantages of the present invention will become apparent to those of ordinary skill in the art, upon reviewing the following description of specific, exemplary embodiments of the present invention in conjunction with the accompanying figures. While features of the present invention may be discussed relative to certain examples and figures below, all embodiments of the present invention can include one or more of the advantageous features discussed herein. In other words, while one or more embodiments may be discussed as having certain advantageous features, one or more of such features may also be used in accordance with the various other embodiments of the invention discussed herein. In similar fashion, while exemplary embodiments may be discussed below as device, system, or method embodiments, it should be understood that such exemplary embodiments can be implemented in various devices, systems, and methods.

DETAILED DESCRIPTION

Figure 1:
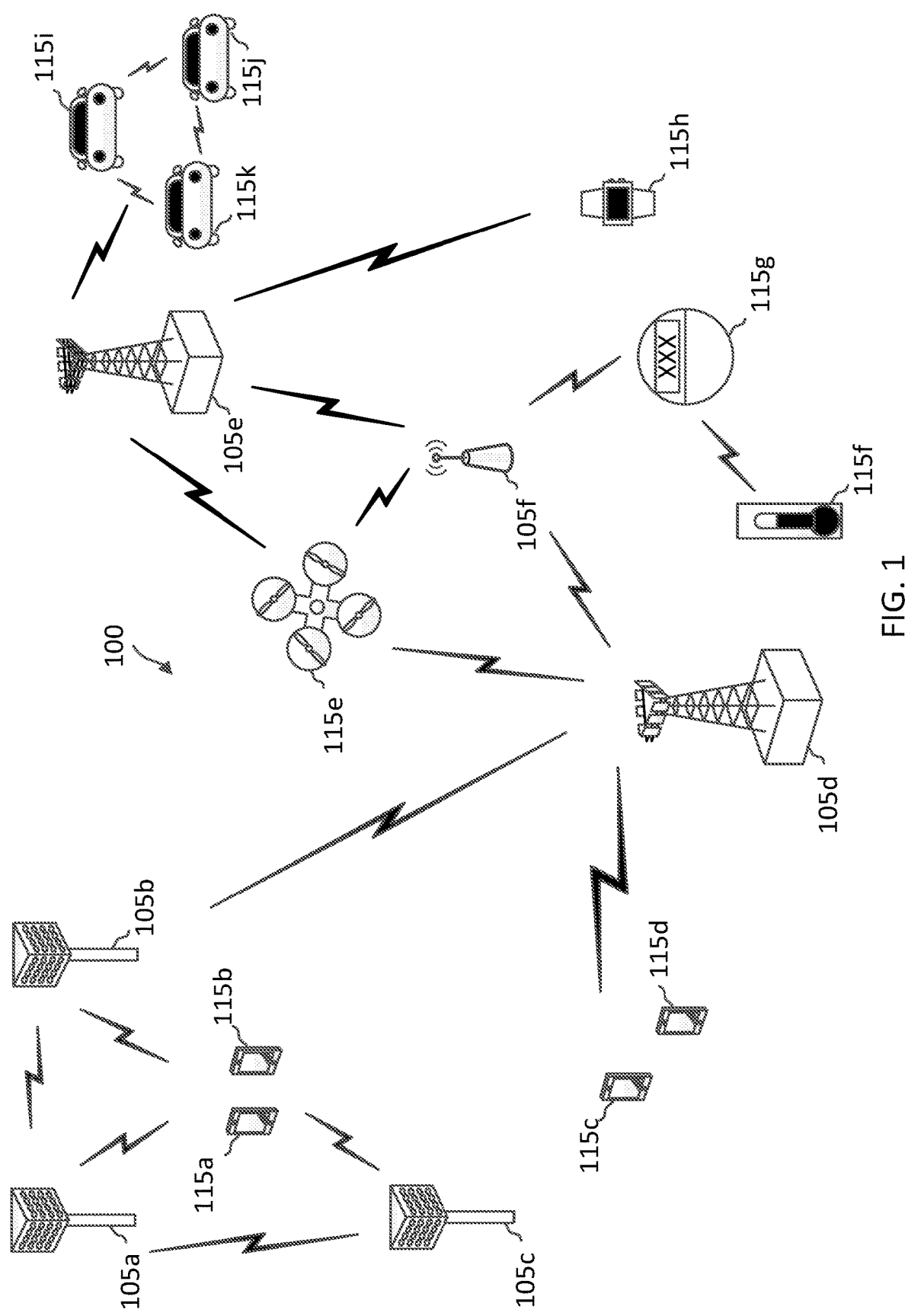
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ULtra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

In a wireless communication network, DRX is a technique in which a UE may enter a sleep mode for a certain period of time and enter a wake-up mode for another period of time. During the wake-up period, the UE may monitor for PDCCH from a serving BS and decode PDCCH received from the BS. During the sleep period, the UE may not monitor for PDCCH. The sleep mode allows the UE to power down certain radio components or at least switch certain radio components to a lower power state than an active state. Accordingly, the use of DRX can provide power savings at the UE. Similarly, discontinuous transmission (DTX) is a technique that may be utilized by a BS to refrain from transmitting signals in certain situations. When the BS refrains from transmitting signals using DTX, the BS can power down certain radio components, switch certain radio components to a lower power state than an active state, or otherwise reduce the power demand of the BS. In addition, by refraining from transmitting signals using DTX, network traffic and the potential for interference can be reduced.

The present disclosure provides methods, systems, and devices that dictate how a user equipment (UE) should perform a wake-up when a wake-up signal (WUS) is not received from a base station (BS), while simultaneously retaining the power savings benefits associated with DRX and DTX operations. In some instances, a default wake-up configuration is utilized by the UE when a WUS is not received from the BS during a WUS occasion. In this regard, the default wake-up configuration may cause the UE to skip PDCCH monitoring (e.g., remain in sleep mode) during an on-duration associated with the WUS occasion. Alternatively, the default wake-up configuration may cause the UE to actively perform PDCCH monitoring during the on-duration associated with the WUS occasion. The default wake-up configuration can be dynamically and/or semi-statically configured to select whether the UE should skip or actively perform PDCCH monitoring during the on-duration associated with the WUS occasion.

These and other aspects of the present disclosure can provide several benefits. For example, the amount of time a UE can spend in a sleep mode as part of a DRX operation, including a connected mode DRX (C-DRX), can be increased, reducing power consumption and increasing battery life. In this regard, having the UE remain in a sleep state instead of unnecessarily monitoring for PDCCH facilitates the UE powering down or off one or more components of the UE associated with receiving, decoding, and/or otherwise processing PDCCH signals. Similarly, the amount of time a BS can refrain from transmitting signals as part of a DTX operation can be increased, reducing the power consumption of the BS, reducing network traffic, saving system resources, and reducing the potential for interference. Additional features and benefits of the present disclosure are set forth in the following description.

FIG. 1 illustrates a wireless communication network 100 according to some embodiments of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115k are examples of various machines configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink and/or uplink, or desired transmission between BSs, and backhaul transmissions between BSs.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-hop configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as in a vehicle-to-vehicle (V2V).

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In an embodiment, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In an embodiment, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In an embodiment, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical uplink control channel (PUCCH), physical uplink shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as a message 1 (MSG 1), a message 2 (MSG 2), a message 3 (MSG 3), and a message 4 (MSG 4), respectively. In some examples, the random access procedure may be a two-step random access procedure, where the UE 115 may transmit a random access preamble and a connection request in a single transmission and the BS 105 may respond by transmitting a random access response and a connection response in a single transmission. The combined random access preamble and connection request in the two-step random access procedure may be referred to as a message A (MSG A). The combined random access response and connection response in the two-step random access procedure may be referred to as a message B (MSG B).

After establishing a connection, the UE 115 may initiate an initial network attachment procedure with the network 100. When the UE 115 has no active data communication with the BS 105 after the network attachment, the UE 115 may return to an idle state (e.g., RRC idle mode). Alternatively, the UE 115 and the BS 105 can enter an operational state or active state, where operational data may be exchanged (e.g., RRC connected mode). For example, the BS 105 may schedule the UE 115 for UL and/or DL communications. The BS 105 may transmit UL and/or DL scheduling grants to the UE 115 via a PDCCH. The BS 105 may transmit a DL communication signal to the UE 115 via a PDSCH according to a DL scheduling grant. The UE 115 may transmit a UL communication signal to the BS 105 via a PUSCH and/or PUCCH according to a UL scheduling grant. In some embodiments, the BS 105 and the UE 115 may employ hybrid automatic request (HARD) techniques for communications to improve reliability. Additionally, the UE 115 and/or the BS 105 can utilize DRX (e.g., during RRC idle mode), including connected mode DRX (C-DRX) (e.g., during RRC connected mode), and/or DTX operating modes as discussed in greater detail below.

In an embodiment, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some instances, a BS 105 may assign a pair of BWPs within the CC to a UE 115 for UL and DL communications. For example, the BWP pair may include one BWP for UL communications and one BWP for DL communications. In some instances, the BS 105 may dynamically switch the UE 115 from one BWP to another BWP, for example, from a wideband BWP to a narrowband BWP for power savings or from a narrowband BWP to a wideband BWP for communication.

The BS 105 may additionally configure the UE 115 with one or more CORESETs in a BWP. A CORESET may include a set of frequency resources spanning a number of symbols in time. The BS 105 may configure the UE 115 with one or more search spaces for PDCCH monitoring based on the CORESETS. The UE 115 may perform blind decoding in the search spaces to search for DL control information from the BS. The BS 105 may configure the UE 115 with various different CORSETs and/or search spaces for different types of PDCCH monitoring (e.g., DL/UL schedules and/or wake-up information). In an example, the BS 105 may configure the UE 115 with the BWPs, the CORESETS, and/or the PDCCH search spaces via RRC configurations.

In an embodiment, the BS 105 may establish a RRC connection with the UE 115 in a primary cell (PCell) (e.g., over a primary frequency carrier) and may subsequently configure the UE 115 to communicate over a secondary cell (SCell) (e.g., over a secondary frequency carrier). In an embodiment, the BS 105 may trigger the UE 115 to report channel information based on channel-state-information-reference signal (CSI-RS) transmitted by the BS 105. In some instances, the triggering may be aperiodic, which may be referred to as aperiodic-CSI-RS (A-CSI-RS) triggering.

The network 100 may operate over a shared frequency band or an unlicensed frequency band, for example, at about 3.5 gigahertz (GHz), sub-6 GHz or higher frequencies in the mmWave band. The network 100 may partition a frequency band into multiple channels, for example, each occupying about 20 megahertz (MHz). The BSs 105 and the UEs 115 may be operated by multiple network operating entities sharing resources in the shared communication medium and may acquire channel occupancy time (COT) in the share medium for communications. A COT may be non-continuous in time and may refer to an amount of time a wireless node can send frames when it has won contention for the wireless medium. Each COT may include a plurality of transmission slots. A COT may also be referred to as a transmission opportunity (TXOP).

Figure 2:
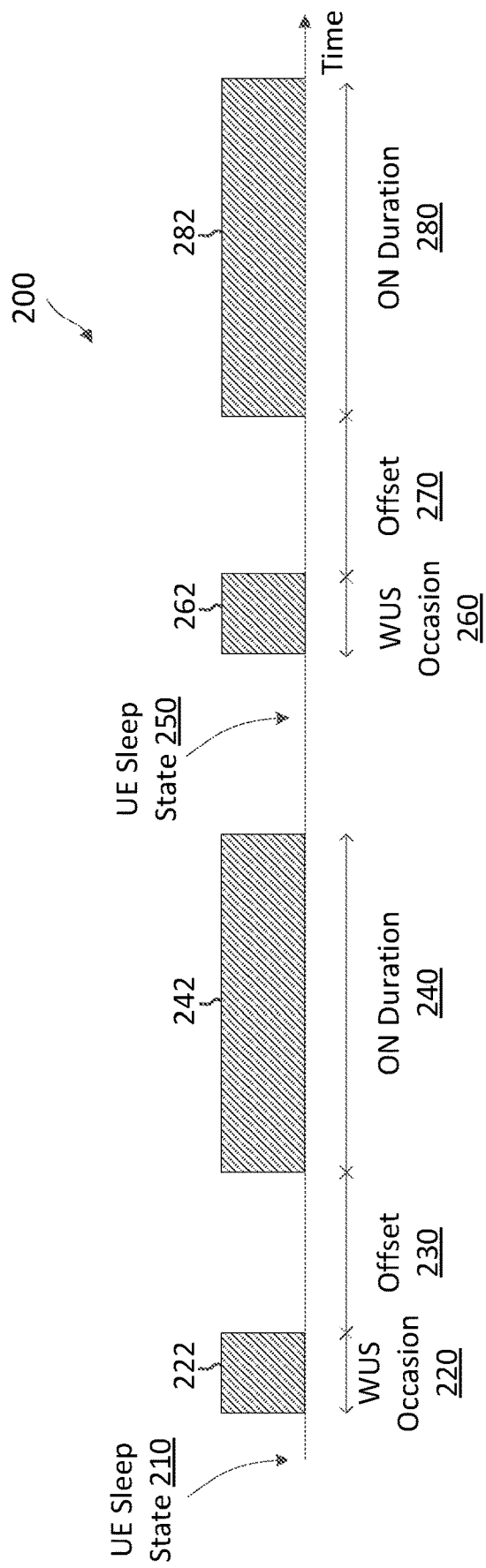
FIG. 2 illustrates a scheduling/transmission configuration of a wireless communication method according to some aspects of the present disclosure.

FIG. 2 illustrates a scheduling/transmission configuration 200 of a wireless communication method according to some aspects of the present disclosure. As shown, FIG. 2 shows a UE operating in a DRX mode and/or C-DRX mode in accordance with the present disclosure. The DRX mode and/or the C-DRX mode may have a certain duty cycle with an active/on-period or an inactive/sleep-period. At 210, the UE is in a sleep state. At wake-up signal (WUS) occasion 220, a WUS 222 is transmitted by a BS. The UE can monitor for the WUS 222 during WUS occasion 220. Search space sets can be configured that define the WUS monitoring occasions, including WUS occasion 220. The search space sets can be dedicated as a wake-up search space set. In some instances, a wake-up search space set is dedicated to a particular group of UEs (e.g., based on BWP, carrier, geographical location, priority, service, subscription, etc.). In other instances, a wake-up search space is shared across multiple groups of UEs. In some instances, the UE monitors for the WUS based on a WUS configuration received from the network and/or the BS. In this regard, the WUS configuration can indicate to the UE resources (e.g., search space including time and frequency resources, periodicity, channel, BWP, frequency carrier, etc.) associated with a WUS occasion, WUS format, etc.

The WUS occasion 220 is followed by an offset 230, during which the UE can return to a sleep state. The offset 230 spaces the WUS occasion 220 from an on-duration 240. The on-duration 240 is associated with the WUS occasion 220. In the illustrated example, a single on-duration 240 is shown. However, it is understood that multiple on-durations (e.g., 2, 3, 4, 5, 6, etc.) may be associated with a WUS occasion. During the on-duration 240, the UE is an active state and may monitor PDCCH or other signals from the BS and/or transmit UL data to the BS, as indicated by UL/DL communication block 242. In this regard, in some instances the UE performs PDCCH monitoring during the on-duration 240 based on information received in the WUS 222. For example, the WUS 222 may instruct the UE to execute one or more of an aperiodic channel state reference signal (A-CSI-RS) triggering, a PDCCH monitoring reduction, a bandwidth part (BWP) switch, or a secondary cell (Scell) wake-up.

As shown in FIG. 2, this same process repeats with the UE in a sleep state 250, followed by another WUS occasion 260 where a WUS 262 is transmitted. Offset 270 spaces the WUS occasion 260 from an associated on-duration 280 where DL/UL communications 282 occur.

Figure 3:
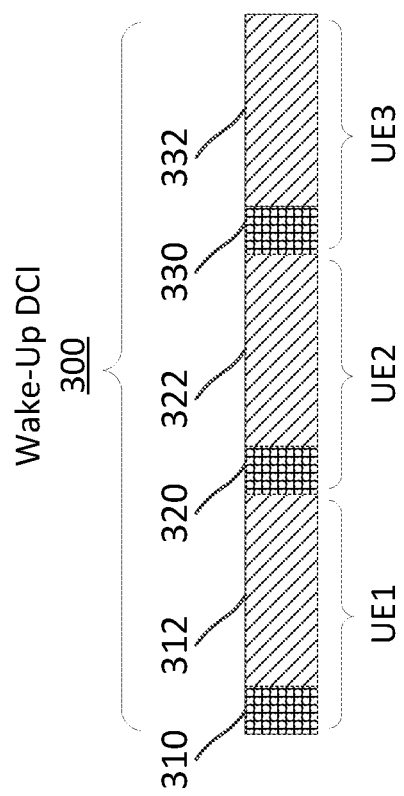
FIG. 3 illustrates a message structure of a wireless communication method according to some aspects of the present disclosure.

FIG. 3 illustrates a message structure 300 according to some aspects of the present disclosure. The message structure 300 can be used for WUS 222 or 262 of FIG. 2 in some instances. In this regard, the message structure 300 is suitable to provide wake-up downlink control information (DCI) to a UE, or group of UEs. In this regard, the wake-up DCI may be provided on a per-UE basis or a per UE-group basis. In some instances, UEs are grouped based on BWP, carrier, geographical location, priority, service, subscription, and/or other factors. In some instances, the wake-up DCI is sent with cyclic redundancy check (CRC) scrambled by an identifier associated with the UE (e.g., C-RNTI) or the group of UEs (e.g., power saving radio network temporary identifier (PS-RNTI). In this regard, UEs in the same group may be configured with a common identifier (e.g., PS-RNTI) and utilize the same search space set for the wake-up DCI.

As shown in FIG. 3, the message structure 300 includes a wake-up indicator and wake-up field information for each UE or group of UEs. More specifically, in the illustrated example, the message structure is shown with a wake-up indicator 310 and wake-up field information 312 for UE1, a wake-up indicator 320 and wake-up field information 322 for UE2, and a wake-up indicator 330 and wake-up field information 332 for UE3. In this regard, the wake-up indicators 310, 320, 330 can indicate to the associated UE or group of UEs whether to remain in a sleep state or enter an active state during one or more on-durations associated with the WUS occasion in which the wake-up DCI is transmitted.

For example, a value of 1 in the wake-up indicator field can indicate for the UE to wake up and monitor during the next on-duration, whereas a value of 0 in the wake-up indicator field can indicate the UE should skip the next on-duration and remain in sleep state. The wake-up field information 312, 322, 332 can indicate to the associated UE or group of UEs details as to how the UE should perform the PDCCH monitoring during the associated on-duration(s) if the UE is to enter an active state (e.g., when the wake-up indicator is a 1). For example, the wake-up field information 312, 322, 332 may instruct the UE to execute one or more of an aperiodic channel state reference signal (A-CSI-RS) triggering, a PDCCH monitoring reduction, a bandwidth part (BWP) switch, or a secondary cell (Scell) wake-up. Additionally, the wake-up field information 312, 322, 332 may include PDCCH monitoring parameters, such as PDCCH monitoring duration, PDCCH monitoring periodicity, number of candidates for PDCCH blind decoding, for PDCCH monitoring during a wake-up on-duration associated with a corresponding WUS. While the message structure depicted in FIG. 3 interleaves the wake-up indicators 310, 320, 330 with the wake-up information fields 312, 322, 332 into pairs based on UE (or UE group), it is understood that any suitable message structure or arrangement may be utilized, including have all of the wake-up indicators 310, 320, 330 prior to all wake-up information fields 312, 322, 332, including all wake-up information fields 312, 322, 332 prior to all wake-up indicators 310, 320, 330, interleaving the wake-up indicators 310, 320, 330 and wake-up information fields 312, 322, 332 leading with the wake-up information fields, etc.

Each of the wake-up indicators 310, 320, 330 and wake-up information fields 312, 322, 332 may have any suitable bit-length. In some instances, each of the wake-up indicators 310, 320, 330 may have a bit-length of 1. When the network traffic is light or sparse, the wake-up indicators 310, 320, 330 may be have a bit-values of 0 most of the time. Conversely, when the network traffic is heavy or dense, the wake-up indicators 310, 320, 330 may have bit-values of ones most of the time.

Figure 4:
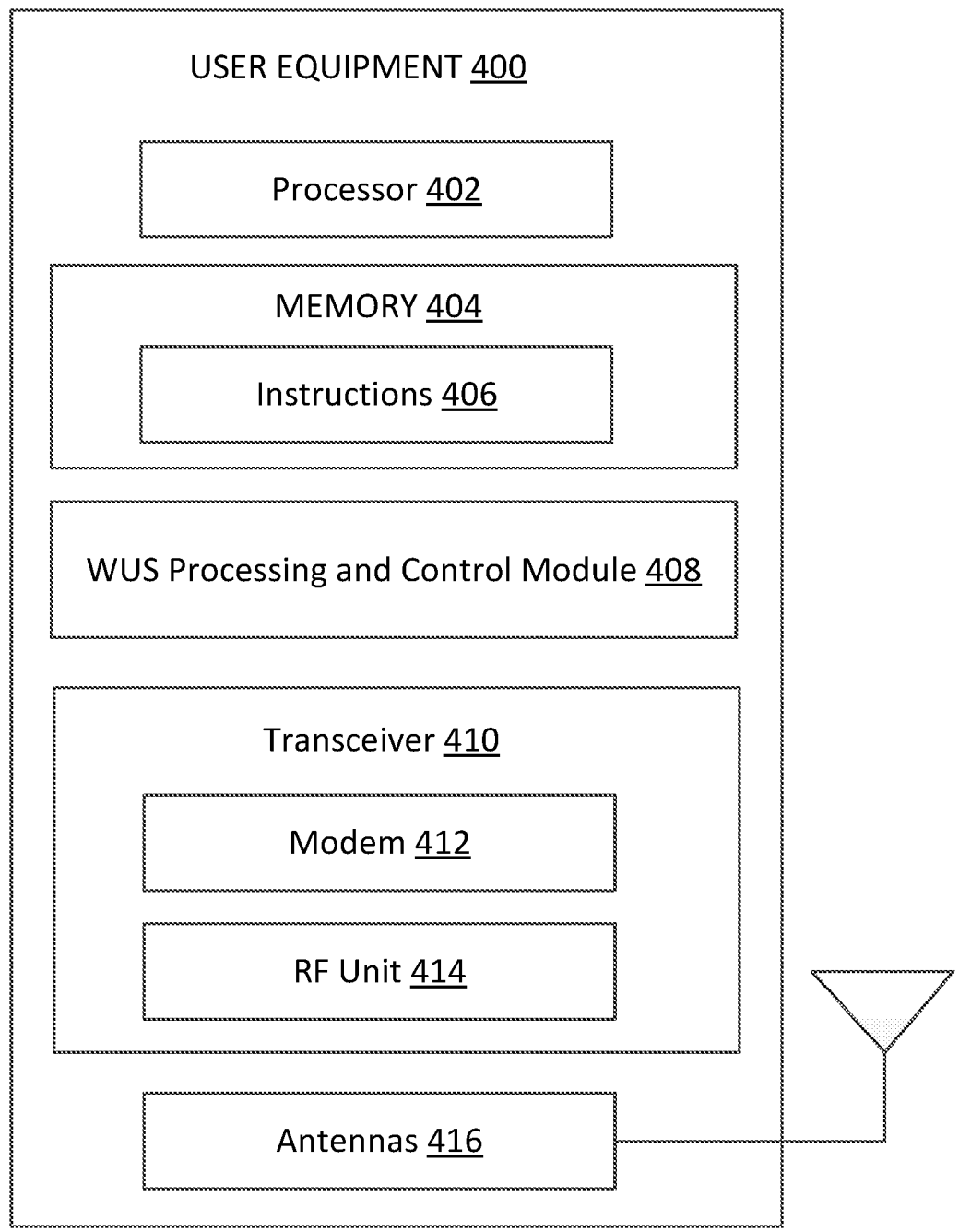
FIG. 4 is a block diagram of a user equipment (UE) according to some aspects of the present disclosure.

FIG. 4 is a block diagram of an exemplary UE 400 according to aspects of the present disclosure. The UE 400 may be a UE 115 as discussed above in FIG. 1. As shown, the UE 400 may include a processor 402, a memory 404, a WUS processing and control module 408, a transceiver 410 including a modem subsystem 412 and a radio frequency (RF) unit 414, and one or more antennas 416. These elements may be in direct or indirect communication with each other, for example via one or more buses.

The processor 402 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 404 includes a non-transitory computer-readable medium. The memory 404 may store, or have recorded thereon, instructions 406. The instructions 406 may include instructions that, when executed by the processor 402, cause the processor 402 to perform the operations described herein with reference to the UEs 115 in connection with aspects of the present disclosure, for example, aspects of FIGS. 2, 3, 6-12. Instructions 406 may also be referred to as program code. The program code may be for causing a wireless communication device (or specific component(s) of the wireless communication device) to perform these operations, for example by causing one or more processors (such as processor 402) to control or command the wireless communication device (or specific component(s) of the wireless communication device) to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The WUS processing and control module 408 may be implemented via hardware, software, or combinations thereof. For example, WUS processing and control module 408 may be implemented as a processor, circuit, and/or instructions 406 stored in the memory 404 and executed by the processor 402. In some examples, the WUS processing and control module 408 can be integrated within the modem subsystem 412. For example, the WUS processing and control module 408 can be implemented by a combination of software components (e.g., executed by a DSP or a general processor) and hardware components (e.g., logic gates and circuitry) within the modem subsystem 412.

The WUS processing and control module 408 may be used for various aspects of the present disclosure, for example, aspects of FIGS. 2, 3, and 6-12. The WUS processing and control module 408 is configured to communicate with other components of the UE 400 to receive a default wake-up configuration associated with a discontinuous reception (DRX) operation (e.g., for idle mode or connected mode), monitor for a WUS from the BS during a wake-up signal (WUS) occasion, determine whether the WUS was received from the BS during the WUS occasion, perform PDCCH monitoring; receive a WUS (including a WUS configuration) during a WUS occasion; operate using one or more wake-up configurations, start a timer, determine whether a timer has expired, cancel a timer, determine whether a condition has occurred or is met, and/or perform other functionalities related to the wake-up procedures of a UE described in the present disclosure.

As shown, the transceiver 410 may include the modem subsystem 412 and the RF unit 414. The transceiver 410 can be configured to communicate bi-directionally with other devices, such as the BSs 105. The modem subsystem 412 may be configured to modulate and/or encode the data from the memory 404, and/or the WUS processing and control module 408 according to a modulation and coding scheme (MCS) (e.g., a low-density parity check (LDPC) coding scheme, a turbo coding scheme, a convolutional coding scheme, a digital beamforming scheme, etc.). The RF unit 414 may be configured to process (e.g., perform analog to digital conversion or digital to analog conversion, etc.) modulated/encoded data (e.g., UL control information, UL data) from the modem subsystem 412 (on outbound transmissions) or of transmissions originating from another source such as a UE 115 or a BS 105. The RF unit 414 may be further configured to perform analog beamforming in conjunction with the digital beamforming. Although shown as integrated together in transceiver 410, the modem subsystem 412 and the RF unit 414 may be separate devices that are coupled together at the UE 115 to enable the UE 115 to communicate with other devices.

The RF unit 414 may provide the modulated and/or processed data (e.g., data packets or, more generally, data messages that may contain one or more data packets and other information) to the antennas 416 for transmission to one or more other devices. The antennas 416 may further receive data messages transmitted from other devices. The antennas 416 may provide the received data messages for processing and/or demodulation at the transceiver 410. The transceiver 410 may provide the demodulated and decoded data (e.g., default wake-up configurations, WUSs, PDCCH signals, radio resource control (RRC) signals, media access control (MAC) control element (CE) signals, DL/UL scheduling grants, DL data, etc.) to the WUS processing and control module 408 for processing. The antennas 416 may include multiple antennas of similar or different designs in order to sustain multiple transmission links. The RF unit 414 may configure the antennas 416. The RF unit 414 and/or the transceiver 410 may include components and/or circuitries that can be powers on and/or off dynamically for power savings. Additionally, or alternatively, the RF unit 414 and/or the transceiver 410 may include components and/or circuitries with multiple power states that can be configured to transition from one power state (e.g., a higher-power state) to another power state (e.g., a lower-power state) for power savings.

In an embodiment, the UE 400 can include multiple transceivers 410 implementing different RATs (e.g., NR and LTE). In an embodiment, the UE 400 can include a single transceiver 410 implementing multiple RATs (e.g., NR and LTE). In an embodiment, the transceiver 410 can include various components, where different combinations of components can implement different RATs.

Figure 5:
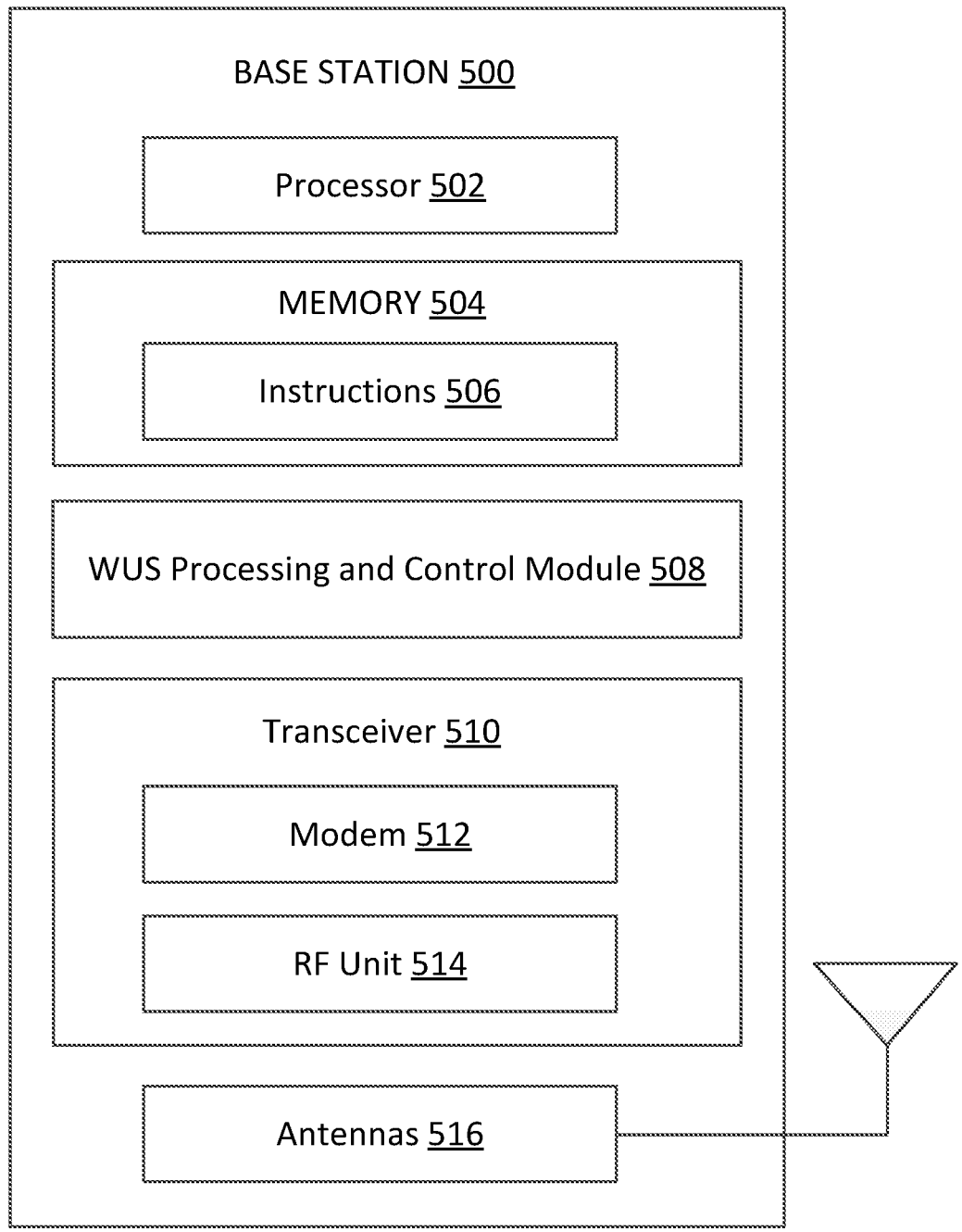
FIG. 5 is a block diagram of an exemplary base station (BS) according to aspects of the present disclosure.

FIG. 5 is a block diagram of an exemplary BS 500 according to aspects of the present disclosure. The BS 500 may be a BS 105 as discussed above in FIG. 1. As shown, the BS 500 may include a processor 502, a memory 504, a WUS processing and control module 508, a transceiver 510 including a modem subsystem 512 and a RF unit 514, and one or more antennas 516. These elements may be in direct or indirect communication with each other, for example via one or more buses.

The processor 502 may have various features as a specific-type processor. For example, these may include a CPU, a DSP, an ASIC, a controller, a FPGA device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some instances, the memory 504 may include a non-transitory computer-readable medium. The memory 504 may store instructions 506. The instructions 506 may include instructions that, when executed by the processor 502, cause the processor 502 to perform operations described herein, for example, aspects of FIGS. 2, 3, 6-11, and 13. Instructions 506 may also be referred to as code, which may be interpreted broadly to include any type of computer-readable statement(s) as discussed above with respect to FIG. 4.

The WUS processing and control module 508 may be implemented via hardware, software, or combinations thereof. For example, the WUS processing and control module 508 may be implemented as a processor, circuit, and/or instructions 506 stored in the memory 504 and executed by the processor 502. In some examples, the WUS processing and control module 508 can be integrated within the modem subsystem 512. For example, the WUS processing and control module 508 can be implemented by a combination of software components (e.g., executed by a DSP or a general processor) and hardware components (e.g., logic gates and circuitry) within the modem subsystem 512.

The WUS processing and control module 508 may be used for various aspects of the present disclosure, for example, aspects of FIGS. 2, 3, 6-11, and 13. The WUS processing and control module 508 can be configured to transmit a default wake-up configuration associated with a discontinuous reception (DRX) operation, determine whether to transmit a WUS during a WUS occasion based on a traffic load, transmit a physical downlink control channel (PDCCH) signal during a duration associated with the WUS occasion, transmit a WUS during a WUS occasion, and/or perform other functionalities of a BS related to the wake-up procedures described in the present disclosure.

As shown, the transceiver 510 may include the modem subsystem 512 and the RF unit 514. The transceiver 510 can be configured to communicate bi-directionally with other devices, such as the UEs 115 and/or 400 and/or another core network element. The modem subsystem 512 may be configured to modulate and/or encode data according to a MCS (e.g., a LDPC coding scheme, a turbo coding scheme, a convolutional coding scheme, a digital beamforming scheme, etc.). The RF unit 514 may be configured to process (e.g., perform analog to digital conversion or digital to analog conversion, etc.) modulated/encoded data (e.g., default wake-up configurations, WUSs; PDCCH signals, RRC signals, MAC CE signals, etc.) from the modem subsystem 512 (on outbound transmissions) or of transmissions originating from another source, such as a UE 115 or 400. The RF unit 514 may be further configured to perform analog beamforming in conjunction with the digital beamforming. Although shown as integrated together in transceiver 510, the modem subsystem 512 and/or the RF unit 514 may be separate devices that are coupled together at the BS 105 to enable the BS 105 to communicate with other devices.

The RF unit 514 may provide the modulated and/or processed data, (e.g., data packets or, more generally, data messages that may contain one or more data packets and other information) to the antennas 516 for transmission to one or more other devices. This may include, for example, transmission of information to a UE 115 or 400 according to aspects of the present disclosure. The antennas 516 may further receive data messages transmitted from other devices and provide the received data messages for processing and/or demodulation at the transceiver 510. The transceiver 510 may provide the demodulated and decoded data (e.g., RACH message(s), ACK/NACKs for WUSs, ACK/NACKs for PDCCH signals, UL data, ACK/NACKs for DL data, etc.) to the WUS processing and control module 508 for processing. The antennas 516 may include multiple antennas of similar or different designs in order to sustain multiple transmission links.

In an embodiment, the BS 500 can include multiple transceivers 510 implementing different RATs (e.g., NR and LTE). In an embodiment, the BS 500 can include a single transceiver 510 implementing multiple RATs (e.g., NR and LTE). In an embodiment, the transceiver 510 can include various components, where different combinations of components can implement different RATs.

Figure 6:
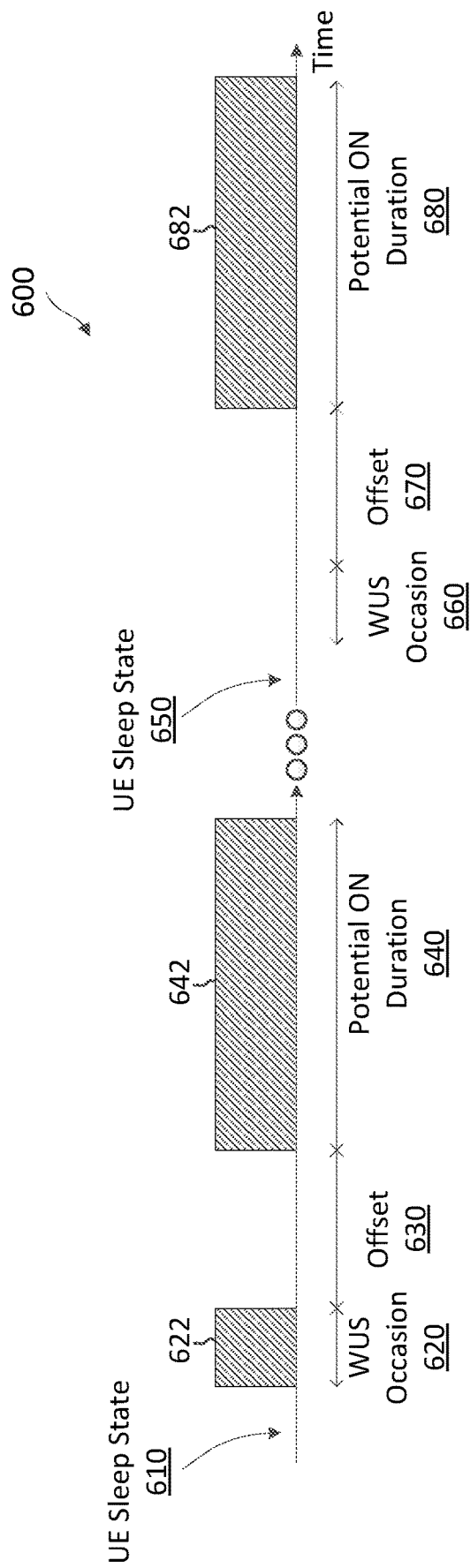
FIG. 6 illustrates a scheduling/transmission configuration of a wireless communication method according to some aspects of the present disclosure.

FIG. 6 illustrates a scheduling/transmission configuration 600 of a wireless communication method according to some aspects of the present disclosure. As shown, the scheduling/transmission configuration 600 is similar in some respects to scheduling/transmission configuration 200 described above with respect to FIG. 2. However, the scheduling/transmission configuration 600 of FIG. 6 also shows a BS operating in a DTX mode along with the UE operating a DRX/C-DRX mode in accordance with the present disclosure.

At 610, the UE is in a sleep state. At WUS occasion 620, a WUS 622 is transmitted by a BS. The UE can monitor for the WUS 622 during WUS occasion 620 (e.g., using a wake-up search space set). The WUS occasion 620 is followed by an offset 630, during which the UE can return to a sleep state. The offset 630 spaces the WUS occasion 620 from an associated on-duration 640. During the on-duration 640, the UE is an active state and may monitor PDCCH or other signals from the BS and/or transmit UL data to the BS, as indicated by UL/DL communication block 642. In this regard, in some instances the UE performs PDCCH monitoring during the on-duration 640 based on information received in the WUS 622. For example, the WUS 622 may instruct the UE to execute one or more of an aperiodic channel state reference signal (A-CSI-RS) triggering, a PDCCH monitoring reduction, a bandwidth part (BWP) switch, or a secondary cell (Scell) wake-up. Additionally, the WUS 622 may include PDCCH monitoring parameters, such as PDCCH monitoring duration, PDCCH monitoring periodicity, number of candidates for PDCCH blind decoding, for PDCCH monitoring during the on-duration 640.

Scheduling/transmission configuration 600 continues with the UE in a sleep state 650, followed by another WUS occasion 660. However, in WUS occasion 660 the BS does not transmit a WUS. Instead, the BS refrains from transmitting a WUS as part of operating in a DTX mode. In some instances, the BS refrains from transmitting a WUS during the WUS occasion 660 based on a traffic load (e.g., a heavy traffic load or a sparse traffic load). Offset 670 spaces the WUS occasion 660 from an associated on-duration 680 where DL/UL communications 682 occur. During the on-duration 680, the UE may be in an active state or a sleep state. In some instances, a default wake-up configuration dictates whether the UE is in an active state or a sleep state during on-duration 680. The UE can receive the default wake-up configuration from the BS (e.g., via radio resource control (RRC) signaling, PDCCH signaling, media access control (MAC) control element (CE) signaling, L1/L2 signaling, or other signaling). In this regard, the default wake-up configuration may be static, semi-static, and/or dynamically configured. In some instances, the default wake-up configuration controls how the UE performs PDCCH monitoring during one or more DRX on-durations following a BS not transmitting a WUS during a WUS occasion as part of a DTX operation.

Figure 7A:
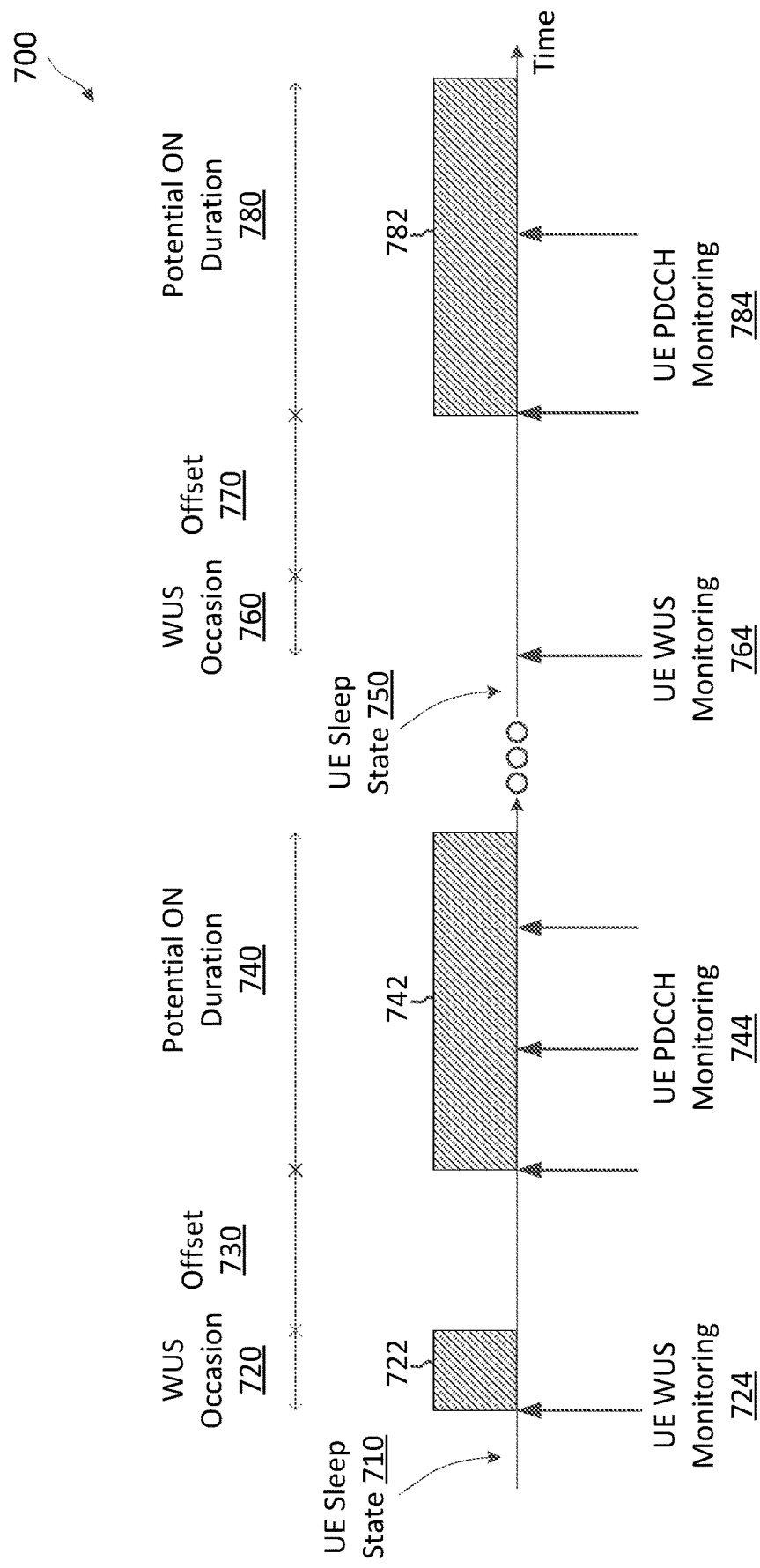
FIG. 7A illustrates a scheduling/transmission configuration of a wireless communication method according to some aspects of the present disclosure.

FIG. 7A illustrates a scheduling/transmission configuration 700 of a wireless communication method according to some aspects of the present disclosure. FIG. 7A illustrates a scheduling/transmission configuration 700 similar to those of FIGS. 2 and 6 but shows an example of a UE performing active PDCCH monitoring during one or more DRX on-durations following a BS not transmitting a WUS during a WUS occasion (e.g., as part of a DTX operation). In this regard, items 710, 720, 722, 730, 740, 742, 750, 760, 770, 780, and 782 of scheduling/transmission configuration 700 correspond to items 610, 620, 622, 630, 640, 642, 650, 660, 670, 680, and 682 of scheduling/transmission configuration 600 of FIG. 6, respectively. Accordingly, for sake of brevity the descriptions will not be repeated here. Please refer to the description of the similar and/or corresponding items of scheduling/transmission configuration 200 of FIG. 2 and/or scheduling/transmission configuration 600 of FIG. 6 for additional details.

As shown in FIG. 7A, the UE performs WUS monitoring 724 during WUS occasion 720. As discussed above, the UE can perform WUS monitoring 724 based on a WUS configuration received from the network and/or the BS. In this regard, the WUS configuration can indicate to the UE resources (e.g., search space including time and frequency resources, periodicity, channel, BWP, frequency carrier, etc.) associated with the WUS occasion 720, format information for the WUS (e.g., message structure), etc. Based on the WUS monitoring 724, the UE will receive the WUS 722. During the on-duration 740, the UE is an active state and may monitor PDCCH or other signals from the BS and/or transmit UL data to the BS, as indicated by UL/DL communication block 742. In this regard, in the illustrated example of FIG. 7A the UE performs PDCCH monitoring 744 during the on-duration 740. The UE can perform the PDCCH monitoring 744 based on information received in the WUS 722. For example, the WUS 722 may instruct the UE to execute one or more of an aperiodic channel state reference signal (A-CSI-RS) triggering, a PDCCH monitoring reduction, a bandwidth part (BWP) switch, or a secondary cell (Scell) wake-up. Additionally, the WUS 722 may include PDCCH monitoring parameters, such as PDCCH monitoring duration, PDCCH monitoring periodicity, number of candidates for PDCCH blind decoding, for PDCCH monitoring during the on-duration 740.

As also shown in FIG. 7A, the UE performs WUS monitoring 764 during WUS occasion 760. This can be similar to WUS monitoring 724 during WUS occasion 720. However, as shown, during WUS 760 the BS does not transmit a WUS and/or the UE does not detect/receive a WUS. In some instances, the BS does not transmit a WUS during WUS occasion 760 as part of a DTX operation. More specifically, in some instances the BS does not transmit a WUS during WUS occasion 760 based on a traffic load (e.g., heavy traffic load or sparse traffic load). Despite not receiving a WUS during WUS occasion 760, the UE is an active state during the on-duration 780 and may monitor PDCCH or other signals from the BS and/or transmit UL data to the BS, as indicated by UL/DL communication block 782. In this regard, in the illustrated example of FIG. 7A the UE performs PDCCH monitoring 784 during the on-duration 780 associated with WUS occasion 760. The UE can actively perform the PDCCH monitoring 784 based on a default wake-up configuration received from the BS (e.g., via RRC signaling, PDCCH signaling, media access control (MAC) control element (CE) signaling, L1/L2 signaling, or other signaling). For example, the default wake-up configuration may instruct the UE to execute one or more of an aperiodic channel state reference signal (A-CSI-RS) triggering, a PDCCH monitoring reduction, a bandwidth part (BWP) switch, or a secondary cell (Scell) wake-up in one or more on-durations associated with the WUS occasion 760 when the UE does not receive and/or detect a WUS from the BS during WUS occasion 760.

Figure 7B:
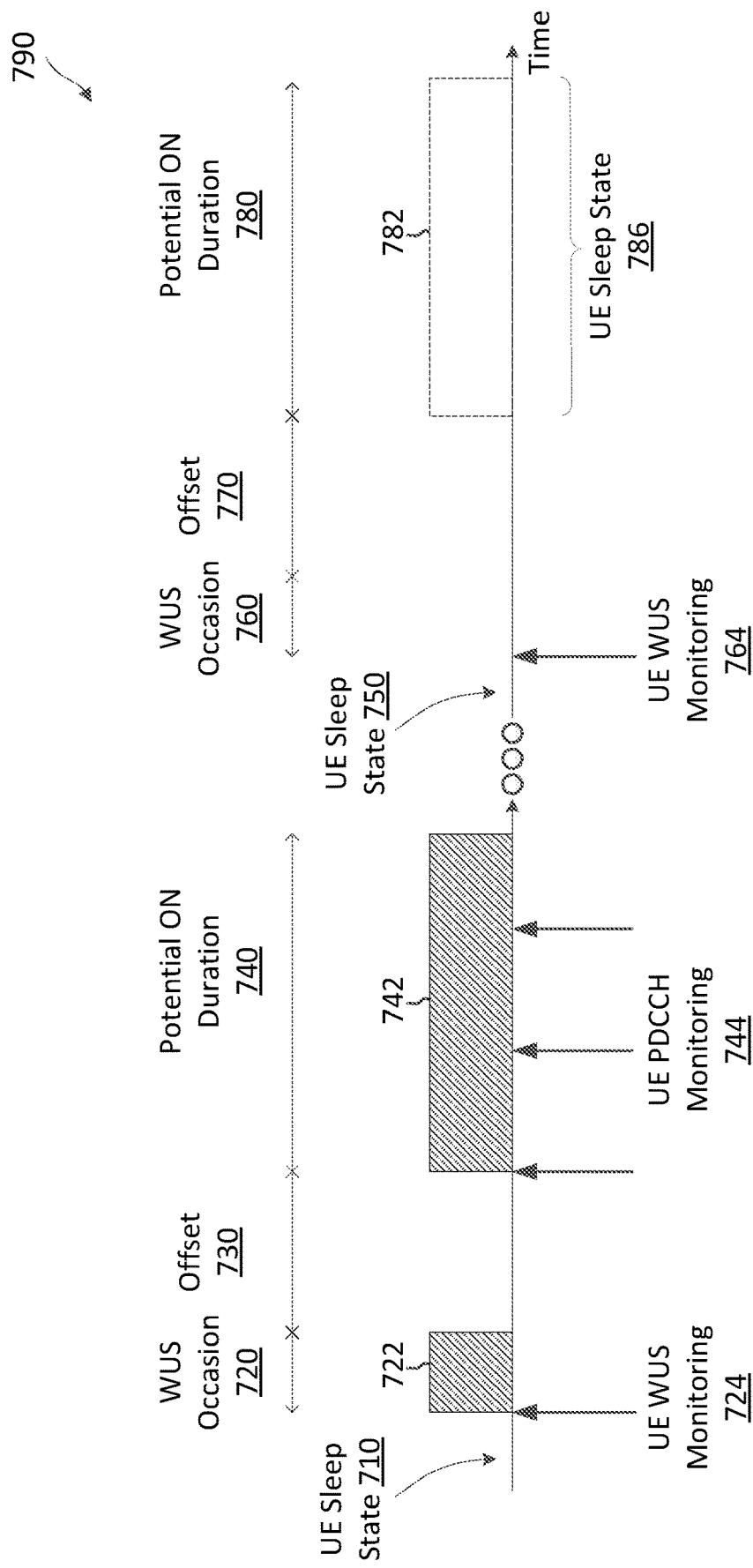
FIG. 7B illustrates a scheduling/transmission configuration of a wireless communication method according to some aspects of the present disclosure.

FIG. 7B illustrates a scheduling/transmission configuration 790 of a wireless communication method according to some aspects of the present disclosure. FIG. 7B illustrates a scheduling/transmission configuration 790 similar to those of FIGS. 2, 6, and 7A, but shows an example of a UE skipping PDCCH monitoring—by remaining in a sleep state—during one or more DRX on-durations following a BS not transmitting a WUS during a WUS occasion (e.g., as part of a DTX operation). More specifically, in the illustrated example of FIG. 7B the UE does not perform PDCCH monitoring during the on-duration 780 and, instead, remains in a sleep state 786 during the on-duration 780 associated with WUS occasion 760. The UE can be in sleep state 786 based on a default wake-up configuration received from the BS (e.g., via RRC signaling, PDCCH signaling, media access control (MAC) control element (CE) signaling, or other signaling). For example, the default wake-up configuration may instruct the UE to skip PDCCH monitoring and/or otherwise utilize a sleep state in one or more on-durations associated with the WUS occasion 760 when the UE does not receive and/or detect a WUS from the BS during WUS occasion 760.

Figure 8A:
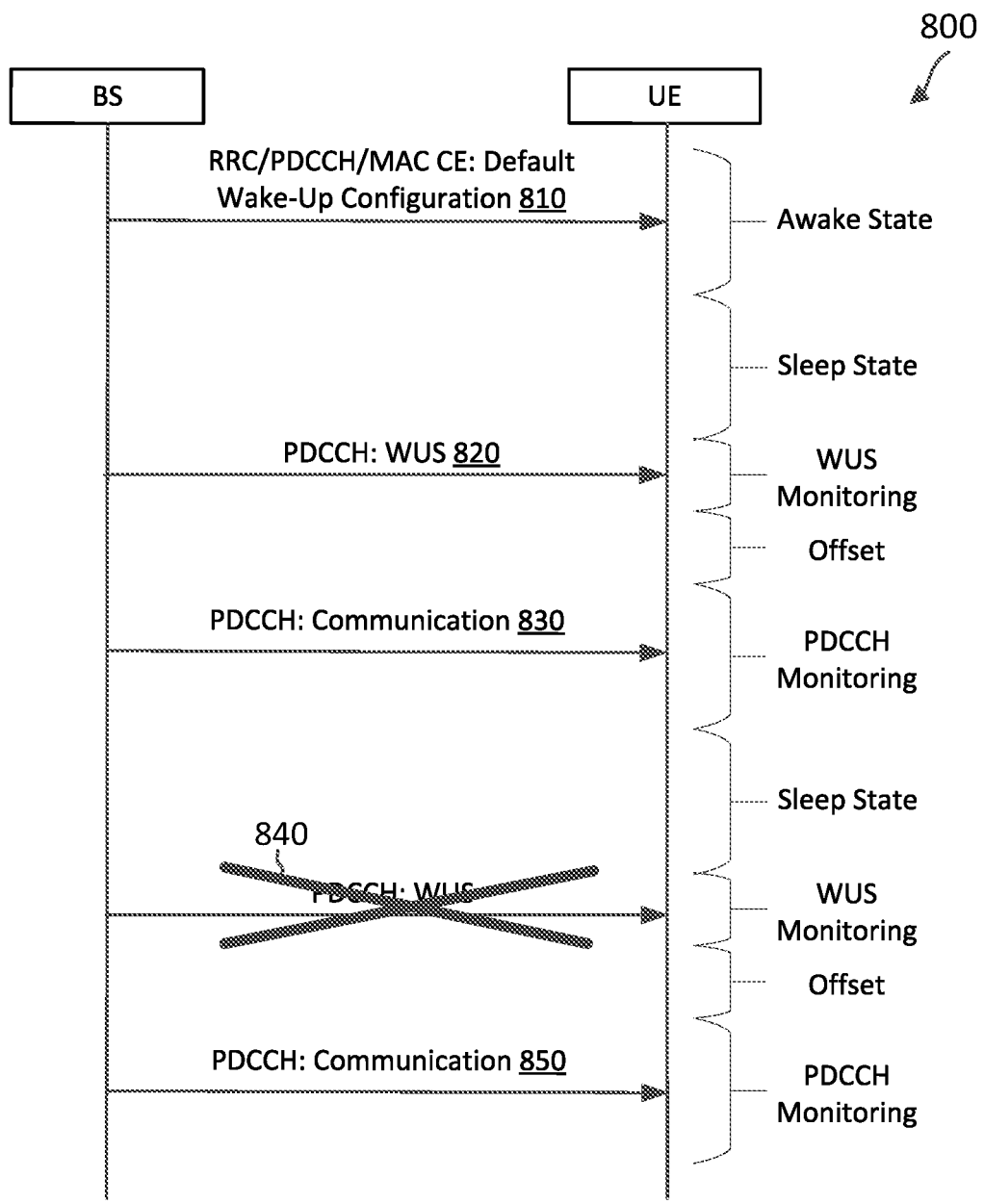
FIG. 8A illustrates a protocol diagram of a wireless communication method according to some aspects of the present disclosure.

FIG. 8A illustrates a protocol diagram of a wireless communication method 800 according to some aspects of the present disclosure. More specifically, FIG. 8A illustrates a method 800 corresponding to the scheduling/transmission configuration 700 of FIG. 7A or similar scheduling/transmission configuration showing an example of a UE performing active PDCCH monitoring during one or more DRX on-durations following a BS not transmitting a WUS during a WUS occasion (e.g., as part of a DTX operation).

As shown, the method 800 includes a BS transmitting a default wake-up configuration 810 to a UE in an active state. The default wake-up configuration 810 can be transmitted to the active state UE via RRC, PDCCH, MAC CE, L1/L2 signaling, or other suitable signaling.

The method 800 also includes the BS transmitting WUS 820 to the UE (or a group of UEs). In this regard, the UE performs WUS monitoring for the WUS 820 following a sleep state. In some instances, the UE performs the WUS monitoring in accordance with a WUS configuration.

The method 800 also includes the BS transmitting PDCCH signaling 830. Following an offset period, the UE performs PDCCH monitoring. In some instances, the UE performs PDCCH monitoring for the PDCCH signaling 830 based on information in the WUS 820. In this regard, the WUS 820 may indicate for the UE to perform active PDCCH monitoring during the on-duration in which PDCCH signaling 830 is transmitted.

The method 800 also includes the BS refraining from transmitting a WUS, as indicated by 840, during a WUS occasion, for example, to save system resources. In this regard, the method 800 includes the UE determining that a WUS was not received from the BS during the WUS occasion based on its WUS monitoring.

The method 800 also includes the BS transmitting PDCCH signaling 850. Following an offset period, the UE performs PDCCH monitoring. In some instances, the UE performs PDCCH monitoring for the PDCCH signaling 850 based on the default wake-up configuration 810 received from the BS. In this regard, the default wake-up configuration 810 may indicate for the UE to perform active PDCCH monitoring during the on-duration in which PDCCH signaling 850 is transmitted, as shown in FIG. 8A.

Figure 8B:
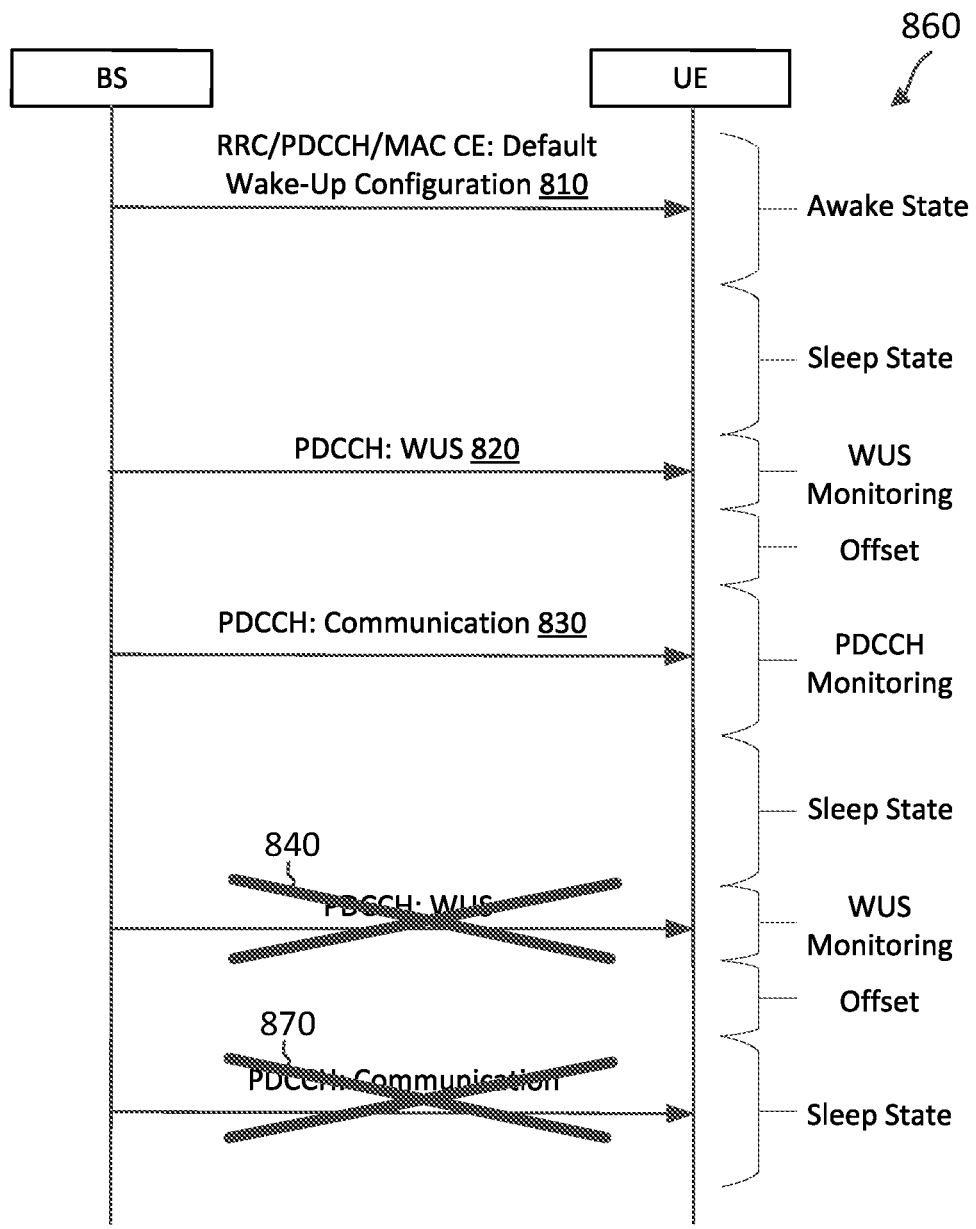
FIG. 8B illustrates a protocol diagram of a wireless communication method according to some aspects of the present disclosure.

FIG. 8B illustrates a protocol diagram of a wireless communication method 860 according to some aspects of the present disclosure. More specifically, FIG. 8B illustrates a method 860 corresponding to the scheduling/transmission configuration 790 of FIG. 7B or similar scheduling/transmission configuration showing an example of a UE skipping PDCCH monitoring—by remaining in a sleep state—during one or more DRX on-durations following a BS not transmitting a WUS during a WUS occasion (e.g., as part of a DTX operation). In this regard, the method 860 is similar in many respects to method 800, including steps 810, 820, 830, and 840. However, in method 860 the BS refrains from transmitting PDCCH signaling to the UE (or group of UEs), as indicated by 870. That is, the BS does not transmit PDCCH signaling for the UE (or group of UEs) after refraining from transmitting a WUS during the WUS occasion. In some instances, the UE also skips PDCCH monitoring based on the default wake-up configuration 810 received from the BS. In this regard, the default wake-up configuration 810 may, as shown in FIG. 8B, indicate for the UE to skip PDCCH monitoring during an on-duration corresponding to the WUS occasion in which the BS refrains from transmitting a WUS.

Figure 9:
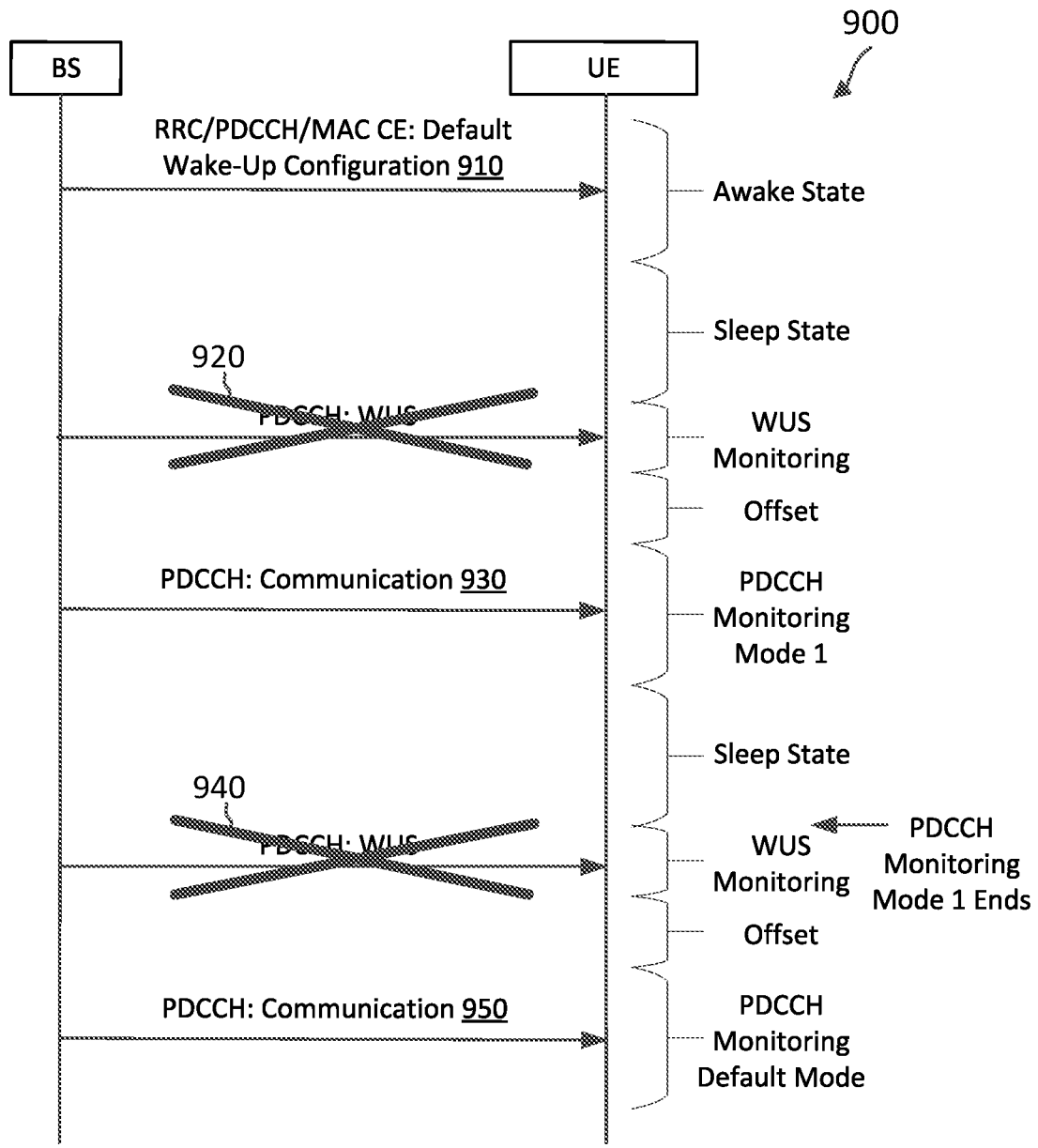
FIG. 9 illustrates a protocol diagram of a wireless communication method according to some aspects of the present disclosure.

FIG. 9 illustrates a protocol diagram of a wireless communication method 900 according to some aspects of the present disclosure. More specifically, FIG. 9 illustrates a method 900 showing an example of a UE operating using two different wake-up configurations in accordance with the present disclosure.

As shown, the method 900 includes a BS transmitting a default wake-up configuration 910 to a UE in an awake state or active state. The default wake-up configuration 910 can be transmitted to the active state UE via RRC, PDCCH, MAC CE, or other suitable signaling.

The method 900 also includes the BS refraining from transmitting a WUS to the UE (or a group of UEs), as indicated by 920, during a WUS occasion. The UE performs WUS monitoring and determines, as part of method 900, that a WUS was not received from the BS during the WUS occasion. In this regard, the UE performs WUS monitoring following a sleep state. In some instances, the UE performs the WUS monitoring in accordance with a WUS configuration.

The method 900 also includes the BS transmitting PDCCH signaling 930. Following an offset period, the UE performs PDCCH monitoring in accordance with a first wake-up configuration (e.g., PDCCH Monitoring Mode 1 in FIG. 9). In some instances, the UE performs PDCCH monitoring for the PDCCH signaling 930 based on the default wake-up configuration 910 received from the BS. In this regard, the default wake-up configuration 910 may indicate for the UE to operate utilizing the first wake-up configuration (e.g., PDCCH Monitoring Mode 1) for a certain amount of time, until a timer expires, and/or until another change condition (e.g., a threshold number (e.g., 1, 2, 3, 4, 5, etc.) of DRX duty cycles and/or WUS occasions occur, UL or DL communication is initiated) is met and then operate in a second, different wake-up configuration (e.g., PDCCH Monitoring Mode 2 in FIG. 9). In some instances, the first wake-up configuration (e.g., PDCCH Monitoring Mode 1) is a default or fallback wake-up configuration such that the UE operates in the first wake-up configuration unless and until a certain condition is met (e.g., certain amount of time passes, a timer expires, threshold number of WUS occasions pass, UL communication is initiated, DL communication is initiated, etc.), at which point the UE will switch to the second wake-up configuration (e.g., PDCCH Monitoring Mode 2). In other instances, the second wake-up configuration (e.g., PDCCH Monitoring Mode 2) is a default or fallback wake-up configuration such that the UE operates in the first wake-up configuration until a certain condition is met (e.g., certain amount of time passes, a timer expires, threshold number of WUS occasions pass, UL communication is initiated, DL communication is initiated, etc.), at which point the UE will fall back to the default, second wake-up configuration.

In the illustrated embodiment of FIG. 9, the first wake-up configuration (PDCCH Monitoring Mode 1) is shown ending at the end of a UE sleep state and the beginning of a WUS occasion in which the UE will perform WUS monitoring. However, it is understood that the first wake-up configuration (PDCCH Monitoring Mode 1) may end, and another wake-up configuration begin, at any time based on a timer, condition, or other parameter. Further, while FIG. 9 illustrates the UE operating in two different wake-up configurations, it is understood that the UE may operate in any number of different wake-up configurations. In this regard, in some instances the UE may store two or more wake-up configurations in memory and the BS may provide an indication as to which of the stored wake-up configurations the UE is to use (and for what period of time). Further, the BS may provide the UE with updated wake-up configurations for local storage by the UE from time to time. In this manner, both the available wake-up configurations as well as the actual wake-up configuration being implemented by the UE can be semi-statically and/or dynamically updated over time.

Figure 10:
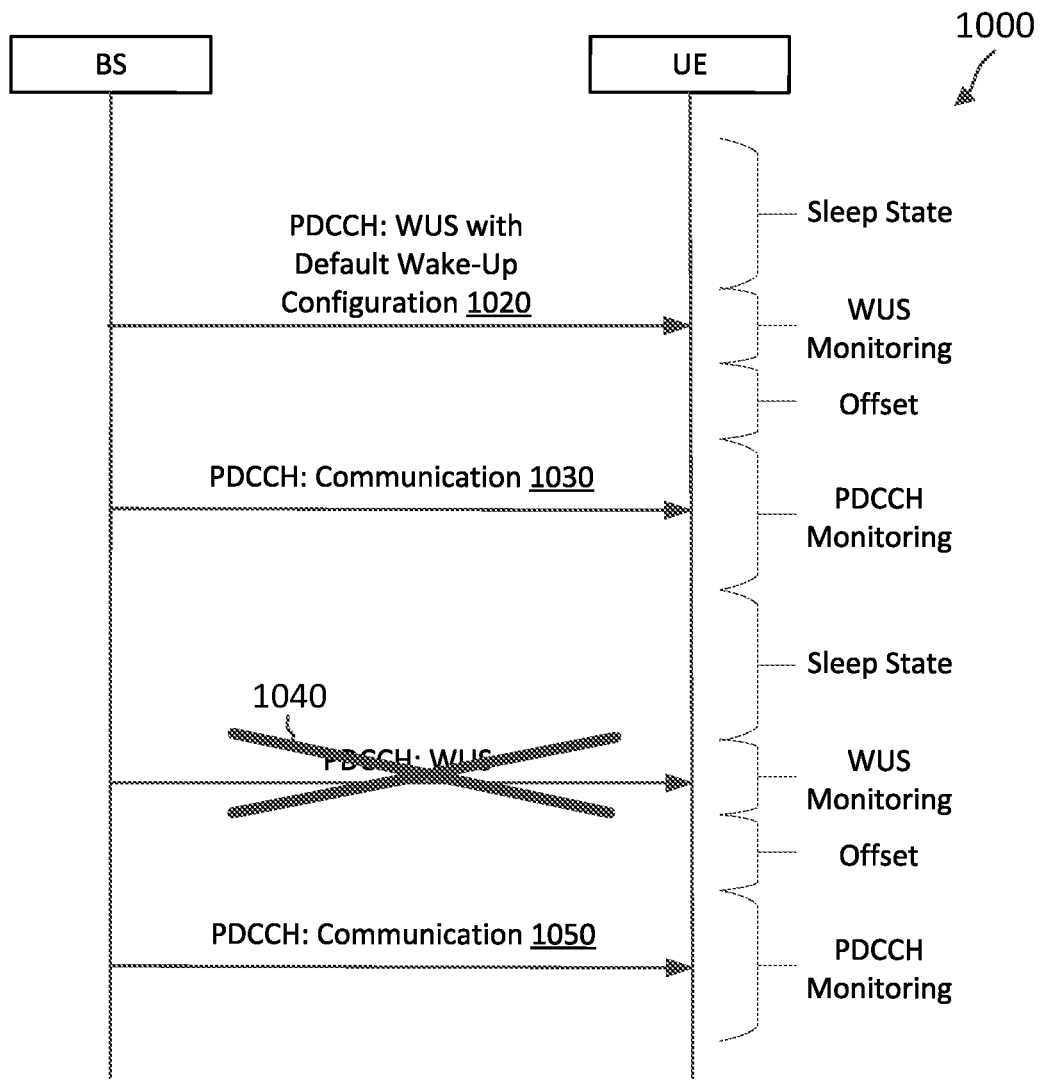
FIG. 10 illustrates a protocol diagram of a wireless communication method according to some aspects of the present disclosure.

FIG. 10 illustrates a protocol diagram of a wireless communication method 1000 according to some aspects of the present disclosure. More specifically, FIG. 10 illustrates a method 1000 similar to method 800 of FIG. 8A and corresponding to the scheduling/transmission configuration 700 of FIG. 7A or similar scheduling/transmission configuration but illustrating an example where the UE receives a default wake-up configuration from the BS as part of a WUS. As shown, at step 1020, the method 1000 includes the BS transmitting a WUS to the UE (or group of UEs) that includes a default wake-up configuration. The WUS with the default wake-up configuration may be transmitted via PDCCH or other suitable signaling. The remaining steps of method 1000 (e.g., 1030, 1040, and 1050) are similar to steps 830, 840, and 850 of method 800 and the associated UE actions shown in FIG. 8A. However, in other instances the remaining steps of method 1000 (e.g., 1030, 1040, and 1050) are similar to steps 830, 840, and 870 of method 860 and the associated UE actions shown in FIG. 8B.

In some instances, the UE receives the default wake-up configuration or an indication as to which default wake-up configuration to utilize in a manner other than from a BS. For example, the default wake-up configuration can be mandated by specification (i.e., without signaling) in some instances. Additionally, the UE may be pre-programmed (e.g., in memory 404) with one or more default wake-up configurations. In some implementations, the UE utilizes the pre-programmed default wake-up configuration(s) based on one or more of operating conditions (e.g., connection status, BWP, carrier, geographical location, priority, service, subscription, etc.). In this regard, each of the pre-programmed default wake-up configuration(s) may be associated with one or more of the operating conditions and the UE selects an appropriate default wake configuration based on the current operating conditions. In some instances, the UE may receive an indication from the BS as to which of the pre-programmed default wake-up configurations to utilize. Further still, in some instances the UE may be the default wake-up configuration from another UE (e.g., through a peer-to-peer communication). For example, a UE may receive the default wake-up configuration from another UE in a common group (e.g., based on BWP, carrier, geographical location, priority, service, subscription, etc.). In yet other instances, the UE may receive the default wake-up configuration from one or more other network devices.

Figure 11:
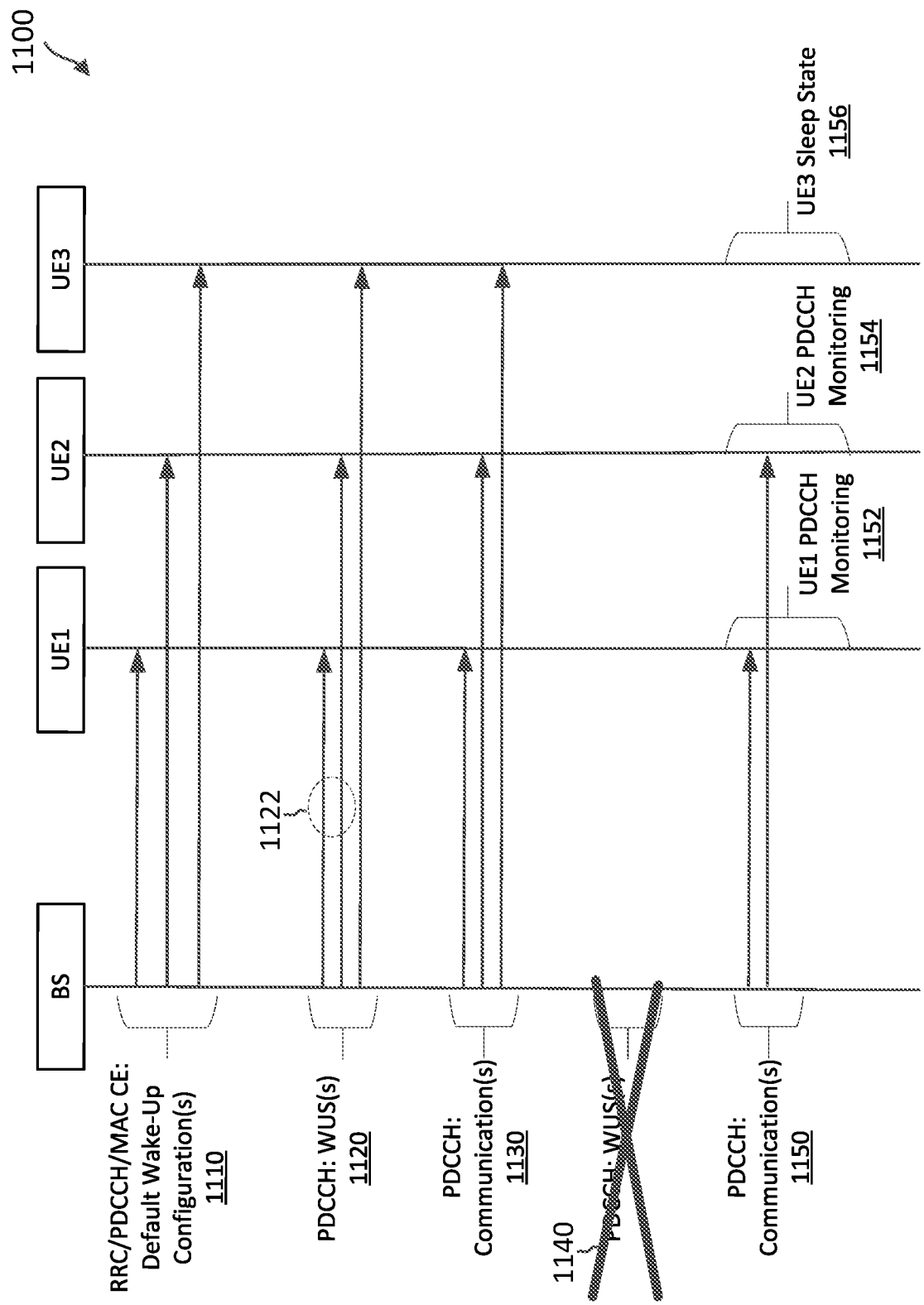
FIG. 11 illustrates a protocol diagram of a wireless communication method according to some aspects of the present disclosure.

FIG. 11 illustrates a protocol diagram of a wireless communication method 1100 according to some aspects of the present disclosure. More specifically, FIG. 11 illustrates a method 1100 showing communications between a BS and multiple UEs as part of a DRX/DTX wake up procedure in accordance with the present disclosure.

As shown, the method 1100 includes a BS transmitting one or more default wake-up configurations 1110 to multiple UEs (i.e., UE1, UE2, and UE3 in FIG. 11). The UEs may be in an awake state or active state when receiving the default wake-up configuration(s) 1110. The default wake-up configuration(s) 1110 can be transmitted to the active state UEs via RRC, PDCCH, MAC CE, or other suitable signaling. In some instances, the default wake-up configuration(s) 1110 are communicated to the UEs as part of a WUS (see, e.g., FIG. 10). The UEs may receive the same or different wake-up configurations 1110. For example, in some implementations UEs are grouped based on BWP, carrier, geographical location, priority, service, subscription, and/or other factors. UEs in a common group can receive the same wake-up configuration 1110. In other instances, the wake-up configurations 1110 are UE-specific. In this regard, UEs within a common group can receive different default wake-up configurations 1110 (e.g., based on a UE's traffic load).

The method 1100 also includes the BS transmitting WUS(s) 1120 to the UEs. In this regard, UEs in a common group can be configured to receive the same WUS 1120 and/or portion of the WUS (see, e.g., message format 300). For example, in the illustrated example of FIG. 11, a grouping 1122 indicates that the same WUS (or portion) is being sent to UE1 and UE2. In this regard, UE1 and UE2 can be part of a common group (e.g. based on BWP, carrier, geographical location, priority, service, subscription, and/or other factors) or otherwise be configured to receive the same WUS (or portion) from the BS. In other instances, different WUS(s) or (portions) are sent to each UE. In some instances, the UEs monitor for the WUS 1120 in accordance with a WUS configuration. The WUS configuration may be common for a group of UEs and/or UE-specific.

The method 1100 also includes the BS transmitting PDCCH signaling 1130 to the UEs. The UEs can perform PDCCH monitoring for the PDCCH signaling 1130 based on information in the WUS(s) 1120. In this regard, the WUS(s) 1120 may indicate for the UE to perform active PDCCH monitoring during the DRX on-duration in which PDCCH signaling 1130 is transmitted.

The method 1100 also includes the BS refraining from transmitting a WUS, as indicated by 1140, during a WUS occasion, for example, to save system resources. In this regard, the method 1100 can includes the UEs determining that a WUS was not received from the BS during the WUS occasion based on WUS monitoring.

The method 1100 also includes the BS transmitting PDCCH signaling 1150. In some instances, the UEs perform PDCCH monitoring for the PDCCH signaling 1150 based on the default wake-up configuration(s) 1110 received from the BS. In this regard, the default wake-up configuration(s) 1110 may indicate a UE to perform active PDCCH monitoring during the DRX on-duration in which PDCCH signaling 1150 is transmitted. Alternatively, the default wake-up configuration(s) 1110 may indicate a UE to remain in a sleep state during the DRX on-duration in which PDCCH signaling 1150 is transmitted. For example, FIG. 11 shows two UEs performing active PDCCH monitoring (i.e., UE1 performing active PDCCH monitoring 1152 and UE2 performing active PDCCH monitoring 1154), while another UE remains in a sleep state (i.e., UE3 remains in sleep state 1156). In this regard, UEs in a common group (e.g., UE1 and UE2 in FIG. 11) may be configured with the same default wake-up configuration such that the UEs in the common group perform PDCCH monitoring in the same manner when a WUS signal is not received from a BS during a wake-up occasion. While FIG. 9 shows an example with three UEs, it is understood that the concepts of the present disclosure are applicable to any number of UEs (e.g., 5, 10, 15, 20, 50, 100, or more).

Figure 12:
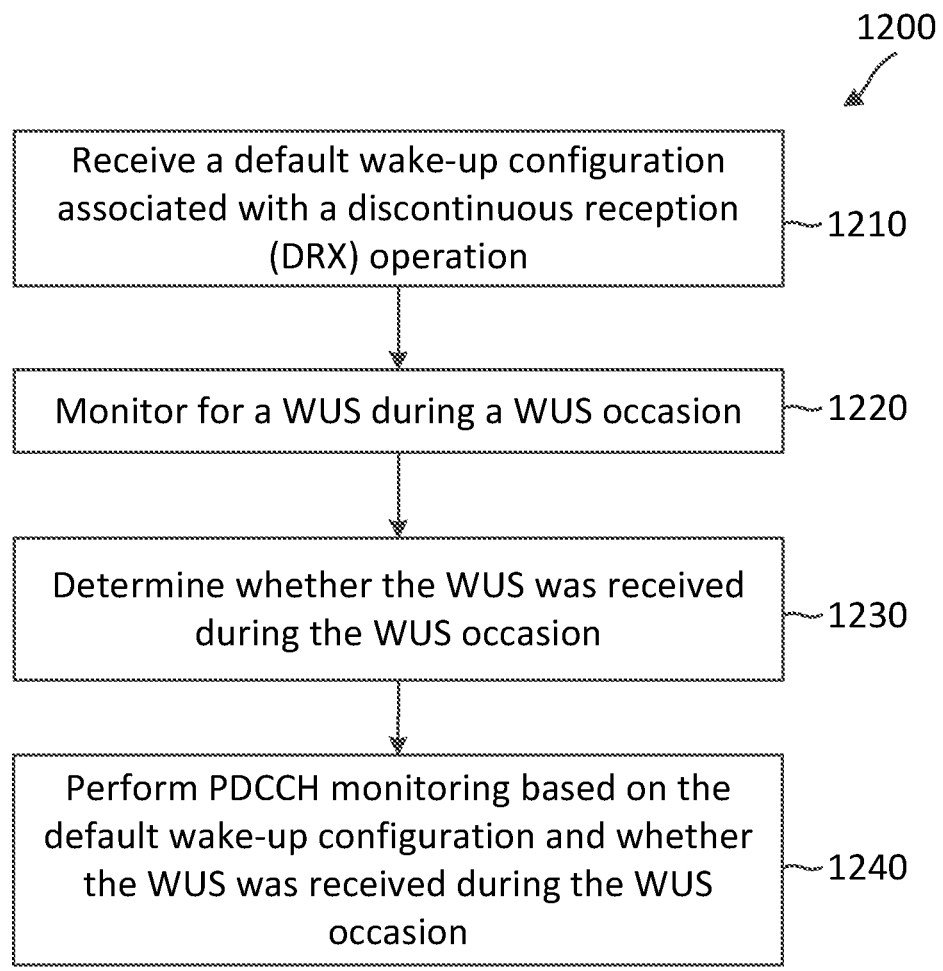
FIG. 12 illustrates a flow diagram of a wireless communication method according to some aspects of the present disclosure.

FIG. 12 is a flow diagram of a communication method 1200 according to some aspects of the present disclosure. Aspects of the method 1200 can be executed by a wireless communication device, such as the UEs 115 and/or 400 utilizing one or more components, such as the processor 402, the memory 404, the WUS processing and control module 408, the transceiver 410, the modem 412, the one or more antennas 416, and various combinations thereof. As illustrated, the method 1200 includes a number of enumerated steps, but the method 1200 may include additional steps before, after, and in between the enumerated steps. For example, in some instances one or more aspects of methods 800, 860, 900, 1000, and/or 1100, scheduling/transmission configurations 200, 600, 700, and/or 790, and/or message structure 300 may be implemented as part of method 1200. In some instances, one or more of the enumerated steps may be omitted or performed in a different order.

At step 1210, the method 1200 includes receiving, by a user equipment (UE) from a base station (BS), a default wake-up configuration associated with a discontinuous reception (DRX) operation. In some instances, step 1210 includes receiving, by the UE from the BS, the default wake-up configuration via at least one of radio resource control (RRC) signaling, PDCCH signaling, or media access control (MAC) control element (CE) signaling. In some instances, the default wake-up configuration includes an indication to the UE to execute one or more of an aperiodic channel state reference signal (A-CSI-RS) triggering, a PDCCH monitoring reduction, a bandwidth part (BWP) switch, or a secondary cell (Scell) wake-up.

In some instances, the received default wake-up configuration includes an indication to the UE to operate in a first wake-up configuration or operate in a second, different wake-up configuration. In some instances, the method 1200 includes operating, by the UE, using the first wake-up configuration for a first time period and operating, by the UE, using the second wake-up configuration for a second time period. In this regard, the UE may operate in the first time period and/or the second time period based on one or more timers. For example, the default wake-up configuration may cause the UE to operate in a first wake-up configuration until a timer expires or other change condition (e.g., a threshold number (e.g., 1, 2, 3, 4, 5, etc.) of DRX duty cycles and/or WUS occasions occur, an UL or DL communication is initiated, etc.) is met and then operate in the second, different wake-up configuration. The default wake-up configuration may also cause the UE to operate in a temporary wake-up configuration, then revert back to a default configuration after some amount of time or upon some condition being met. Any number of different wake-up configurations may be implemented by the BS and/or the UE over time. In this regard, in some instances the UE may store two or more wake-up configurations in memory (e.g., memory 404). The BS may provide an indication to the UE as to which of the wake-up configuration(s) to implement, including for how long (e.g., based on a timer and/or condition). In some instances, the indication to the UE as to which of the wake-up configuration(s) to implement and for what duration is included as part of the default wake-up configuration received at step 1210.

At step 1220, the method 1200 includes monitoring, by the UE during a wake-up signal (WUS) occasion, for a WUS from the BS. The UE can monitor for the WUS based on a WUS configuration received from the BS. In this regard, the method 1200 can include receiving a WUS configuration from the BS. The WUS configuration for the UE, or an associated group of UEs to which the UE belongs, can be fixed, semi-static, and/or dynamically configured by the BS. In some instances, the WUS configuration is received by the UE as part of the WUS transmitted during the WUS occasion. The WUS configuration can indicate to the UE resources (e.g., search spaces including time and frequency, periodicity, channel, BWP, frequency carrier, etc.) associated with a WUS occasion, WUS format, etc. The UE can utilize the information from the WUS configuration to monitor for, receive, and/or decode the WUS.

At step 1230, the method 1200 includes determining, by the UE, whether the WUS was received from the BS during the WUS occasion. The UE may utilize the information from the WUS configuration to determine whether a WUS has been received from the BS. For example, if the UE monitors the resources associated with the WUS occasion and does not detect a WUS, then the UE can determine that a WUS was not received from the BS during the WUS occasion. Additionally, the UE may use an identifier (e.g., PS-RNTI, C-RNTI, etc.) associated with the UE, or a group of UEs, to determine whether a WUS has been received from the BS. For example, if the UE does not receive wake-up downlink control information or WUS addressed to an identifier associated with the UE (or group of UEs that the UE is a part of), then the UE can determine that a WUS was not received from the BS during the WUS occasion.

At step 1240, the method 1200 includes performing, by the UE, physical downlink control channel (PDCCH) monitoring based on the default wake-up configuration and whether the WUS was received from the BS during the WUS occasion. If the UE receives the WUS from the BS during the WUS occasion, then the UE can perform PDCCH monitoring in accordance with the information in the WUS. For example, the WUS may indicate to the UE to trigger an aperiodic channel state reference signal (A-CSI-RS), use a reduced PDCCH monitoring frequency, perform a bandwidth part (BWP) switch, perform a secondary cell (Scell) wake-up, and/or utilize other PDCCH monitoring techniques. Further, the WUS may indicate to the UE to skip PDCCH monitoring (e.g., remain in a sleep state) for one or more of the on-durations associated with the WUS occasion.

The default wake-up configuration can dictate how the UE operates in the event the UE does not receive, at step 1230, a WUS from the BS during the WUS occasion. The default wake-up configuration for the UE, or an associated group of UEs to which the UE belongs, can be fixed, semi-static, and/or dynamically configured by the BS. In some instances, the default wake-up configuration will cause the UE to skip PDCCH monitoring in one or more on-durations associated with the WUS occasion in response to determining that the WUS was not received from the BS during the WUS occasion. In some implementations, the UE skips PDCCH monitoring by remaining in a sleep state in the one or more on-durations, providing additional power savings to the UE. In other instances, the default wake-up configuration causes the UE to actively perform PDCCH monitoring in one or more on-durations associated with the WUS occasion in response to determining that the WUS was not received from the BS during the WUS occasion. In this regard, the default wake-up configuration may indicate to the UE aspects related to performing the PDCCH monitoring. For example, the default wake-up configuration may indicate to the UE to trigger an aperiodic channel state reference signal (A-CSI-RS), use a reduced PDCCH monitoring frequency, perform a bandwidth part (BWP) switch, perform a secondary cell (Scell) wake-up, and/or utilize other PDCCH monitoring techniques. In some instances, the default wake-up configuration is semi-statically and/or dynamically updated based on a traffic load condition (e.g., for a group of UEs, a BWP, a carrier, etc.). The default wake-up configuration may be semi-statically and/or dynamically configured over time to select whether the UE remains in a sleep state during one or more on-durations associated with a WUS occasion (e.g., during sparse traffic conditions) or actively monitors PDCCH during one or more on-durations associated with the WUS occasion (e.g., during heavy traffic conditions).

In addition, according to some aspects, BSs and UEs may utilize a variety of varying wake up configurations. For example, a BS may determine to provide differing wake up configurations to different UEs or other devices in a BS's cell. In this manner, and according to various aspects, different types of UEs have differing default wake up configurations with different wake up characteristics. For example, a first UE may have an initial/first wake up configuration and another UE may have a different wake up configuration. In scenarios where a BS interacts with a number of UEs of different classes or types, providing a variety of different wake up configurations enables a BS to provide UE-specific wake up configurations helping to conserve power and processing resources. By dynamically controlling wake up configurations, BSs can tailor specific operational behaviors to one or more specific UEs in a communications network.

Figure 13:
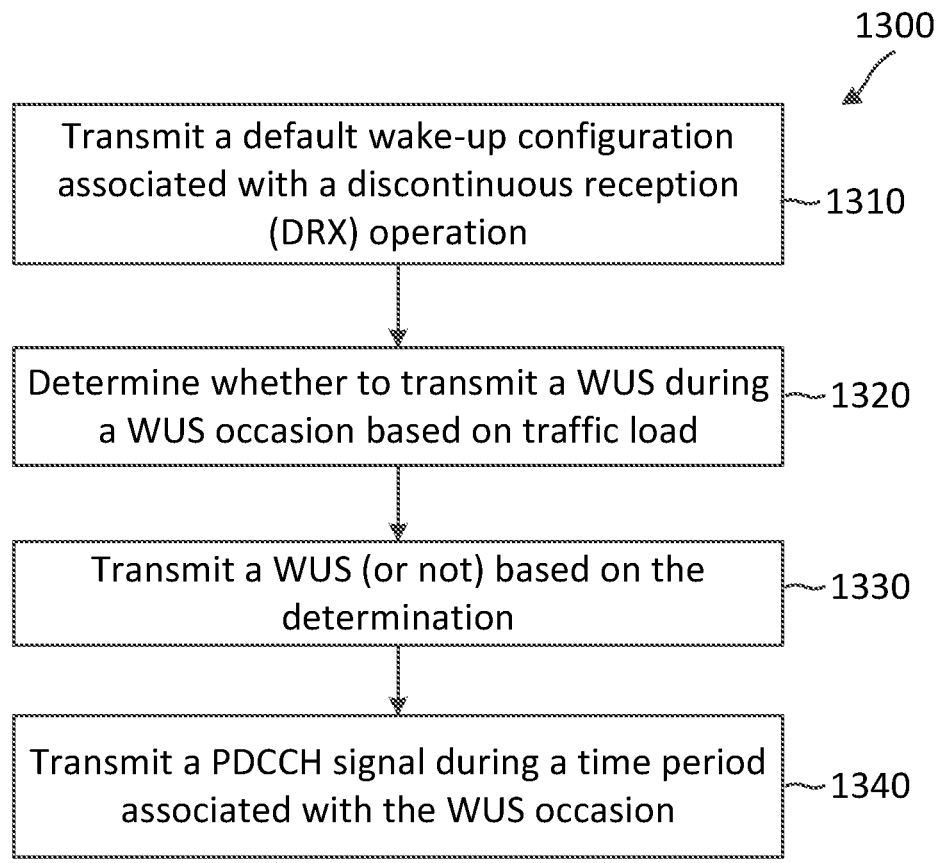
FIG. 13 illustrates a flow diagram of a wireless communication method according to some aspects of the present disclosure.

FIG. 13 is a flow diagram of a communication method 1300 according to some aspects of the present disclosure. Aspects of the method 1300 can be executed by a wireless communication device, such as the BSs 105 and/or 500 utilizing one or more components, such as the processor 502, the memory 504, the WUS processing and control module 508, the transceiver 510, the modem 512, the one or more antennas 516, and various combinations thereof. As illustrated, the method 1300 includes a number of enumerated steps, but the method 1300 may include additional steps before, after, and in between the enumerated steps. For example, in some instances one or more aspects of methods 800, 860, 900, 1000, and/or 1100, scheduling/transmission configurations 200, 600, 700, and/or 790, and/or message structure 300 may be implemented as part of method 1300. In some instances, one or more of the enumerated steps may be omitted or performed in a different order.

At step 1310, the method 1300 includes transmitting, by a base station (BS) to a user equipment (UE), a default wake-up configuration associated with a discontinuous reception (DRX) operation. In some instances, step 1310 includes transmitting, by the BS to the UE, the default wake-up configuration via at least one of radio resource control (RRC) signaling, PDCCH signaling, or media access control (MAC) control element (CE) signaling. In some instances, the default wake-up configuration includes an indication to the UE to execute one or more of an aperiodic channel state reference signal (A-CSI-RS) triggering, a PDCCH monitoring reduction, a bandwidth part (BWP) switch, or a secondary cell (Scell) wake-up. The default wake-up configuration for the UE, or an associated group of UEs to which the UE belongs, can be fixed, semi-static, and/or dynamically configured by the BS. To this end, the BS may transmit an updated default wake-up configuration from time to time. In some instances, the default wake-up configuration is semi-statically and/or dynamically updated by the BS based on a traffic load condition (e.g., for a group of UEs, a BWP, a carrier, etc.). The default wake-up configuration may be semi-statically and/or dynamically configured to select whether the UE remains in a sleep state during one or more on-durations associated with a WUS occasion (e.g., during sparse traffic conditions) or actively monitors PDCCH during one or more on-durations associated with the WUS occasion (e.g., during heavy traffic conditions).

At step 1320, the method 1300 includes determining, by the BS, whether to transmit a wake-up signal (WUS) to the UE during a WUS occasion based on a traffic load. In a sparse traffic scenario, the likelihood of a wake-up being needed for each UE in a wake-up group (e.g., sharing the same PDCCH-WUS) is very small. As a result, most of the time the wake-up indicator(s) of the WUS would be all zeros, or otherwise indicate that the UEs should remain in a sleep state during one or more on-durations associated with the WUS occasion. On the other hand, in a heavy traffic scenario, the likelihood of a wake-up being needed for each UE in the wake-up group is very high. Accordingly, most of the time in such situations the wake-up indicators would be all ones, or otherwise indicate that the UEs should actively monitor PDCCH during one or more on-durations associated with the WUS occasion.

In such sparse traffic and heavy traffic scenarios, the BS may refrain from transmitting a WUS during a WUS occasion. In addition to reducing network traffic and potential interference, the BS refraining from transmitting the WUS can also provide power savings to both the BS and the UE. To this end, in some instances the BS determines not to transmit the WUS to the UE during the WUS occasion if the traffic load is below a first threshold and determines to transmit the WUS to the UE during the WUS occasion if the traffic load is above a second threshold. The first and second thresholds can be the same or different. For example, in some instances, the traffic load is evaluated based on the number of wake-up indicators of WUS that will be the same for a particular WUS and/or WUS occasion. In this regard, the threshold for determining not to transmit the WUS versus the threshold for determining to transmit the WUS may be the same or different. For example, if more than a threshold percentage (e.g., 50%, 60%, 70%, 75%, 80%, 90%, etc.) and/or a threshold number (e.g., 2, 3, 4, 5, 6, 7, 8, etc.) of the wake-up indicators will be the same, then the BS may refrain from transmitting the WUS, regardless of whether the common indicators will indicate for the UEs to wake-up or remain in a sleep state. As another example, the threshold percentage and/or the threshold number of the wake-up indicators needed to be the same for the BS to refrain from transmitting the WUS can be different dependent on whether the common indicators indicate for the UEs to wake-up or remain in a sleep state. In this regard, the threshold percentage and/or the threshold number may be higher when the common indicators indicate for the UEs to wake-up than when the common indicators indicate for the UEs to remain in a sleep state, or vice versa.

At step 1330, the method 1300 includes, based on the determination at step 1320, either (1) transmitting a WUS signal to the UE during the WUS occasion or (2) refraining from transmitting a WUS signal to the UE during the WUS occasion. When the BS transmits the WUS, the BS can utilize the message structure of FIG. 3 or any other suitable message structure (e.g., including all wake-up indicators prior to all wake-up information fields, including all wake-up information fields prior to all wake-up indicators, interleaving wake-up indicators and wake-up information fields, etc.). In some instances, the WUS transmitted by the BS during the WUS occasion includes a WUS configuration for the UE (or group of UEs). The WUS configuration can indicate to the UE the resources (e.g., search spaces including time and frequency, periodicity, channel, BWP, frequency carrier, etc.) associated with a WUS occasion, WUS format, etc. In some instances, the WUS transmitted by the BS during the WUS occasion includes a default wake-up configuration.

When the BS does not transmit a WUS at step 1330, the UE(s) can operate according to the default wake-up configuration transmitted at step 1310. In some instances, the default wake-up configuration sent at step 1310 indicates to the UE to operate in a first wake-up configuration or a second, different wake-up configuration. In some instances, the default wake-up configuration sent at step 1310 indicates to the UE to operate using the first wake-up configuration for a first time period and operate using the second wake-up configuration for a second time period. In this regard, the UE may operate in the first time period and/or the second time period based on one or more timers. For example, the default wake-up configuration may cause the UE to operate in a first wake-up configuration until a timer expires or other change condition (e.g., a threshold number (e.g., 1, 2, 3, 4, 5, etc.) of DRX duty cycles and/or WUS occasions occur, an UL or DL communication is initiated, etc.) is met and then operate in the second, different wake-up configuration. That is, the default wake-up configuration may cause the UE to operate in a temporary wake-up configuration, then revert back to a default configuration after some amount of time or upon some condition being met. Any number of different wake-up configurations may be implemented by the BS and/or the UE over time. As discussed above, the default wake-up configuration may be semi-statically and/or dynamically configured to select whether the UE remains in a sleep state or actively monitors PDCCH during one or more on-durations associated with a WUS occasion.

At step 1340, the method 1300 includes transmitting, by the BS, a physical downlink control channel (PDCCH) signal during a duration associated with the WUS occasion. In this regard, the duration associated with the WUS occasion can include one or more discontinuous reception (DRX) on-durations associated with the WUS occasion. As discussed above, the default wake-up configuration transmitted as step 1310 can dictate how the UE performs PDCCH monitoring during the duration associated with the WUS occasion in the event the BS does not transmit a WUS during the WUS occasion. In some instances, the default wake-up configuration from step 1310 will cause the UE to skip PDCCH monitoring in one or more on-durations associated with the WUS occasion in response to determining that the WUS was not received from the BS during the WUS occasion. In other instances, the default wake-up configuration transmitted at step 1310 causes the UE to actively perform PDCCH monitoring in one or more on-durations associated with the WUS occasion in response to determining that the WUS was not received from the BS during the WUS occasion. That is, the UE will monitor for the PDCCH signal transmitted at 1340 in such instances.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely some examples thereof, but rather, should be fully commensurate with that of the claims appended hereafter and their functional equivalents.

What is claimed is:
1. A method of wireless communication, comprising:
transmitting, by a base station (BS) to a user equipment (UE), a default wake-up configuration associated with a discontinuous reception (DRX) operation;
determining, by the BS, to refrain from transmitting a wake-up signal (WUS) to the UE during a WUS occasion based on a traffic load; and transmitting, by the BS, a physical downlink control channel (PDCCH) signal during a duration associated with the WUS occasion.

2. The method of claim 1, wherein the determining to refrain from transmitting the WUS to the UE during the WUS occasion based on the traffic load comprises:
determining to refrain from transmitting the WUS to the UE during the WUS occasion based on the traffic load being below a first threshold.

3. The method of claim 1, wherein the duration associated with the WUS occasion includes one or more discontinuous reception (DRX) on-durations associated with the WUS occasion.

4. The method of claim 1, wherein the transmitting the default wake-up configuration includes:
transmitting, by the BS to the UE, the default wake-up configuration via at least one of radio resource control (RRC) signaling, PDCCH signaling, or media access control (MAC) control element (CE) signaling.

5. The method of claim 1, wherein the transmitting the default wake-up configuration includes:
transmitting, by the BS to the UE, the default wake-up configuration during the WUS occasion.

6. The method of claim 1, wherein the transmitting the default wake-up configuration includes:
transmitting, by the BS to the UE, the default wake-up configuration having an indication for the UE to operate in a first wake-up configuration or operate in a second wake-up configuration, the second wake-up configuration being different than the first wake-up configuration.

7. The method of claim 1, wherein the transmitting the default wake-up configuration includes:
transmitting, by the BS to the UE, the default wake-up configuration having an indication for the UE to operate, based on a timer, in a first wake-up configuration or a second wake-up configuration.

8. The method of claim 1, wherein the transmitting the default wake- up configuration includes:
transmitting, by the BS, the default wake-up configuration to a group of UEs, including the UE, based on one or more of a bandwidth part (BWP) or a carrier associated with the group of UEs.

9. The method of claim 1, wherein the transmitting the default wake- up configuration includes:
transmitting, by the BS to the UE, the default wake-up configuration having an indication for one or more of an aperiodic channel state reference signal (A-CSI-RS) triggering, a PDCCH monitoring reduction, a bandwidth part (BWP) switch, or a secondary cell (Scell) wake-up.

10. A base station, comprising:
at least one memory;
at least one transceiver; and
at least one processor coupled to the at least one memory and the at least one transceiver, wherein the base station is configured to:
transmit, to a user equipment (UE), a default wake-up configuration associated with a discontinuous reception (DRX) operation;
transmit a physical downlink control channel (PDCCH) signal during a duration associated with a wake-up signal (WUS) occasion; and
determine to refrain from transmitting a WUS to the UE during the WUS occasion based on a traffic load.

11. The base station of claim 10, wherein the base station is configured to:
determine to refrain from transmitting the WUS to the UE during the WUS occasion based on the traffic load being below a first threshold.

12. The base station of claim 10, wherein the duration associated with the WUS occasion includes one or more discontinuous reception (DRX) on-durations associated with the WUS occasion.

13. The base station of claim 10, wherein the base station is further configured to:
transmit, to the UE, the default wake-up configuration via at least one of radio resource control (RRC) signaling, PDCCH signaling, or media access control (MAC) control element (CE) signaling.

14. The base station of claim 10, wherein the base station is further configured to:
transmit, to the UE, the default wake-up configuration during the WUS occasion.

15. The base station of claim 10, wherein the base station is further configured to:
transmit, to the UE, the default wake-up configuration having an indication for the UE to operate in a first wake-up configuration or operate in a second wake-up configuration, the second wake-up configuration being different than the first wake-up configuration.

16. The base station of claim 15, wherein the base station is further configured to:
transmit, to the UE, the default wake-up configuration having an indication for the UE to operate, based on a timer, in the first wake-up configuration or the second wake-up configuration.

17. The base station of claim 10, wherein the base station is further configured to:
transmit the default wake-up configuration to a group of UEs, including the UE, based on one or more of a bandwidth part (BWP) or a carrier associated with the group of UEs.

18. The base station of claim 10, wherein the base station is further configured to:
transmit, to the UE, the default wake-up configuration having an indication for one or more of an aperiodic channel state reference signal (A-CSI-RS) triggering, a PDCCH monitoring reduction, a bandwidth part (BWP) switch, or a secondary cell (Scell) wake-up.

19. A non-transitory computer-readable medium having program code recorded thereon, the program code comprising:
code for causing a base station (BS) to transmit, to a user equipment (UE), a default wake-up configuration associated with a discontinuous reception (DRX) operation;
code for causing the BS to determine to refrain from transmitting a wake-up signal (WUS) to the UE during a WUS occasion based on a traffic load; and
code for causing the BS to transmit a physical downlink control channel (PDCCH) signal during a duration associated with the WUS occasion.

20. The non-transitory computer-readable medium of claim 19, wherein the determining whether to transmit the WUS to the UE during the WUS occasion based on the traffic load includes at least one of:
code for causing the BS to determine not to transmit the WUS to the UE during the WUS occasion based on the traffic load being below a first threshold; or
code for causing the BS to determine to transmit the WUS to the UE during the WUS occasion based on the traffic load being above a second threshold.

* * * * *